US011323236B2

(12) United States Patent
Xu et al.

(10) Patent No.: US 11,323,236 B2
(45) Date of Patent: May 3, 2022

(54) NARROWBAND PDCCH DMRS BUNDLING WITH ENHANCED COVERAGE

(71) Applicant: QUALCOMM Incorporated, San Diego, CA (US)

(72) Inventors: Huilin Xu, San Diego, CA (US); Seyedkianoush Hosseini, San Diego, CA (US); Alexandros Manolakos, San Diego, CA (US); Peter Pui Lok Ang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 29 days.

(21) Appl. No.: 16/911,354

(22) Filed: Jun. 24, 2020

(65) Prior Publication Data

US 2020/0412515 A1 Dec. 31, 2020

Related U.S. Application Data

(60) Provisional application No. 62/866,494, filed on Jun. 25, 2019.

(51) Int. Cl.
*H04W 72/04* (2009.01)
*H04L 5/10* (2006.01)
(Continued)

(52) U.S. Cl.
CPC .............. *H04L 5/10* (2013.01); *H04L 5/0051* (2013.01); *H04W 4/80* (2018.02); *H04W 24/08* (2013.01);
(Continued)

(58) Field of Classification Search
CPC ... H04L 5/0094; H04L 5/0058; H04L 5/0051; H04L 5/0053; H04L 5/10; H04W 4/46;
(Continued)

(56) References Cited

U.S. PATENT DOCUMENTS 7,801,521 B2   9/2010   Dent
9,729,295 B2 * 8/2017   Zhang ................... H04L 5/0053
(Continued)

OTHER PUBLICATIONS

International Search Report and Written Opinion—PCT/US2020/039564—ISA/EPO—dated Oct. 6, 2010.
(Continued)

*Primary Examiner* — Wei Zhao
(74) *Attorney, Agent, or Firm* — Norton Rose Fulbright US LLP

(57) ABSTRACT

Narrowband (NB) Physical Downlink Control Channel (PDCCH) demodulation reference signals (DMRS) bundling coverage enhancements are disclosed. In some aspects, NB PDCCH DMRS bundling resources and timing are allocated in a virtual domain by a transmitting device, such as a base station. In some aspects the allocated resources are control channel elements (CCEs); the CCEs are allocated according to a pattern in the virtual domain. The base station may transmit NB PDCCH transmissions and corresponding DMRS transmissions in physical domain resources that correspond to the virtual domain resources, the CCE allocation pattern. In some aspects, the NB PDCCH DMRS can be used with PDCCH repetitions. To illustrate, a base station may repeat a PDCCH transmission (e.g., payload data thereof) in multiple particular PDCCH candidates of a plurality of PDCCH candidates. The particular PDCCH candidates may be identified based on PDCCH candidate number or a reference slot or search space set occasion.

30 Claims, 12 Drawing Sheets

(51) Int. Cl.
*H04L 5/00* (2006.01)
*H04W 76/27* (2018.01)
*H04W 4/80* (2018.01)
*H04W 24/08* (2009.01)

(52) U.S. Cl.
CPC ..... *H04W 72/042* (2013.01); *H04W 72/0446* (2013.01); *H04W 76/27* (2018.02)

(58) Field of Classification Search
CPC ..... H04W 4/70; H04W 4/80; H04W 72/0446; H04W 72/042; H04W 24/08; H04W 76/27
See application file for complete search history.

(56) References Cited

U.S. PATENT DOCUMENTS

| | | | | |
|---|---|---|---|---|
| 2013/0294318 | A1* | 11/2013 | Amerga | H04W 4/06 370/312 |
| 2016/0127097 | A1 | 5/2016 | Chen et al. | |
| 2017/0013391 | A1 | 1/2017 | Rico Alvarino et al. | |
| 2017/0187414 | A1 | 6/2017 | Talty et al. | |
| 2020/0367242 | A1* | 11/2020 | Moon | H04L 1/00 |

OTHER PUBLICATIONS

Qualcomm Incorporated: "Wideband RS and Narrowband RS", 3GPP Draft, R1-1705600, 3GPP TSG RAN WG1 Meeting #88bis, Wideband RS and Narrowband RS, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017), XP051243724, pp. 1-7, Retrieved from the Internet: URL: http://www.3gpp.org/ftp/Meetings_3GPP_SYNC_RAN1/Docs/ [retrieved on Apr. 2, 2017] Sections 1-3.

* cited by examiner

400

$$L \cdot \left\{ \left( \left\{ Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} \quad \text{404}$$

402

450

| CCE Offset | CCEs For PDDCH Candidate 0 | CCEs For PDDCH Candidate 1 | CCEs For PDDCH Candidate 2 | CCEs For PDDCH Candidate 3 |
|---|---|---|---|---|
| 0 | 0 to 7 | 32 to 39 | 40 to 47 | 56 to 63 |
| 1 | 8 to 15 | 24 to 31 | 48 to 55 | 64 to 71 |
| 2 | 16 to 23 | 32 to 39 | 56 to 63 | 72 to 79 |
| 3 | 0 to 7 | 24 to 31 | 40 to 47 | 64 to 71 |

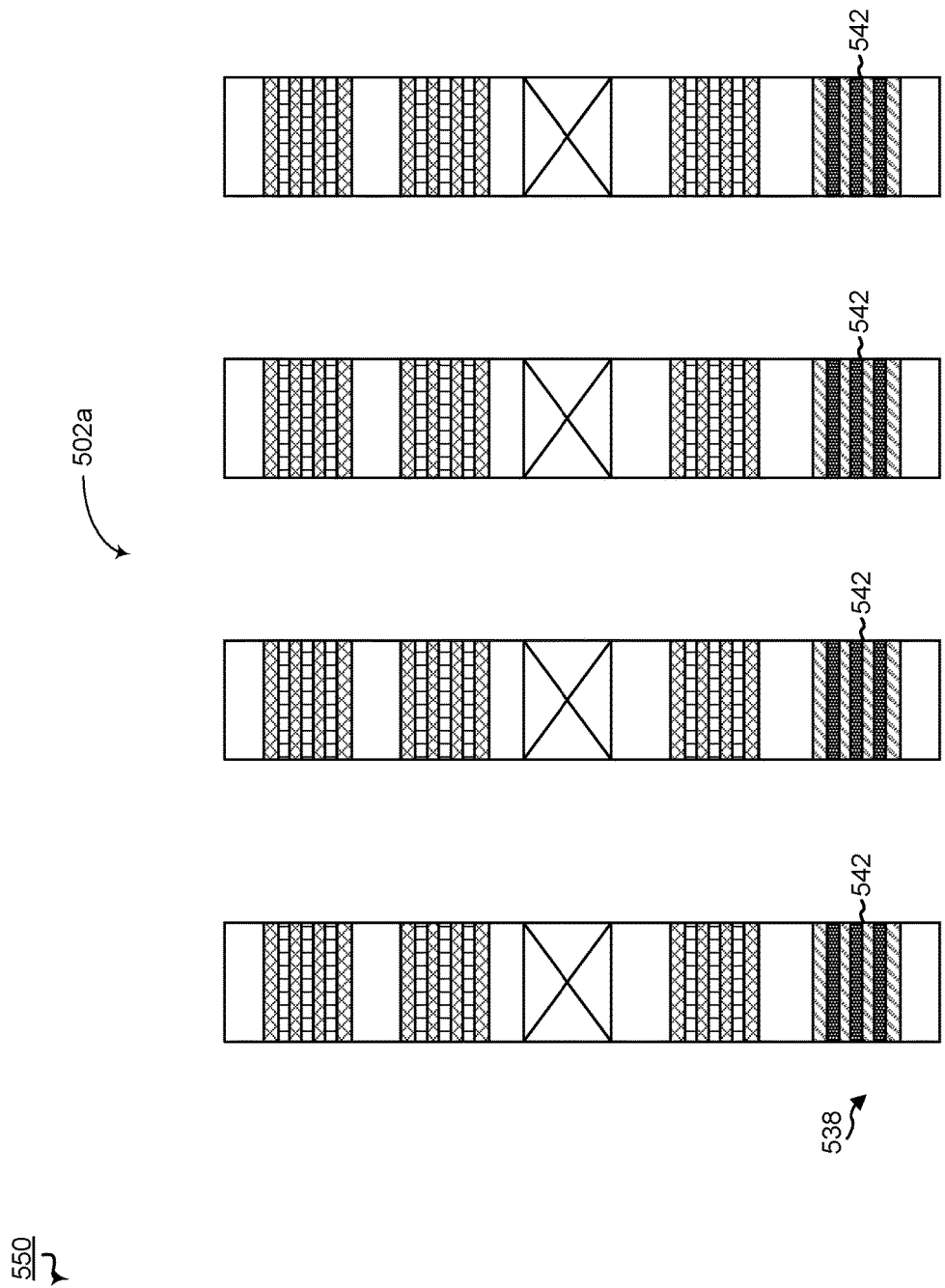

| PDDCH Repetition | CCEs For PDDCH Candidate 0 | CCEs For PDDCH Candidate 1 | CCEs For PDDCH Candidate 2 | CCEs For PDDCH Candidate 3 | Allocated CCEs |
|---|---|---|---|---|---|
| 0 | 0 to 7 | 32 to 39 | 40 to 47 | 56 to 63 | 0 to 7 |
| 1 | 8 to 15 | 24 to 31 | 48 to 55 | 64 to 71 | 0 to 7 |
| 2 | 16 to 23 | 32 to 39 | 56 to 63 | 72 to 79 | 0 to 7 |
| 3 | 0 to 7 | 24 to 31 | 40 to 47 | 64 to 71 | 0 to 7 |

*FIG. 6A*

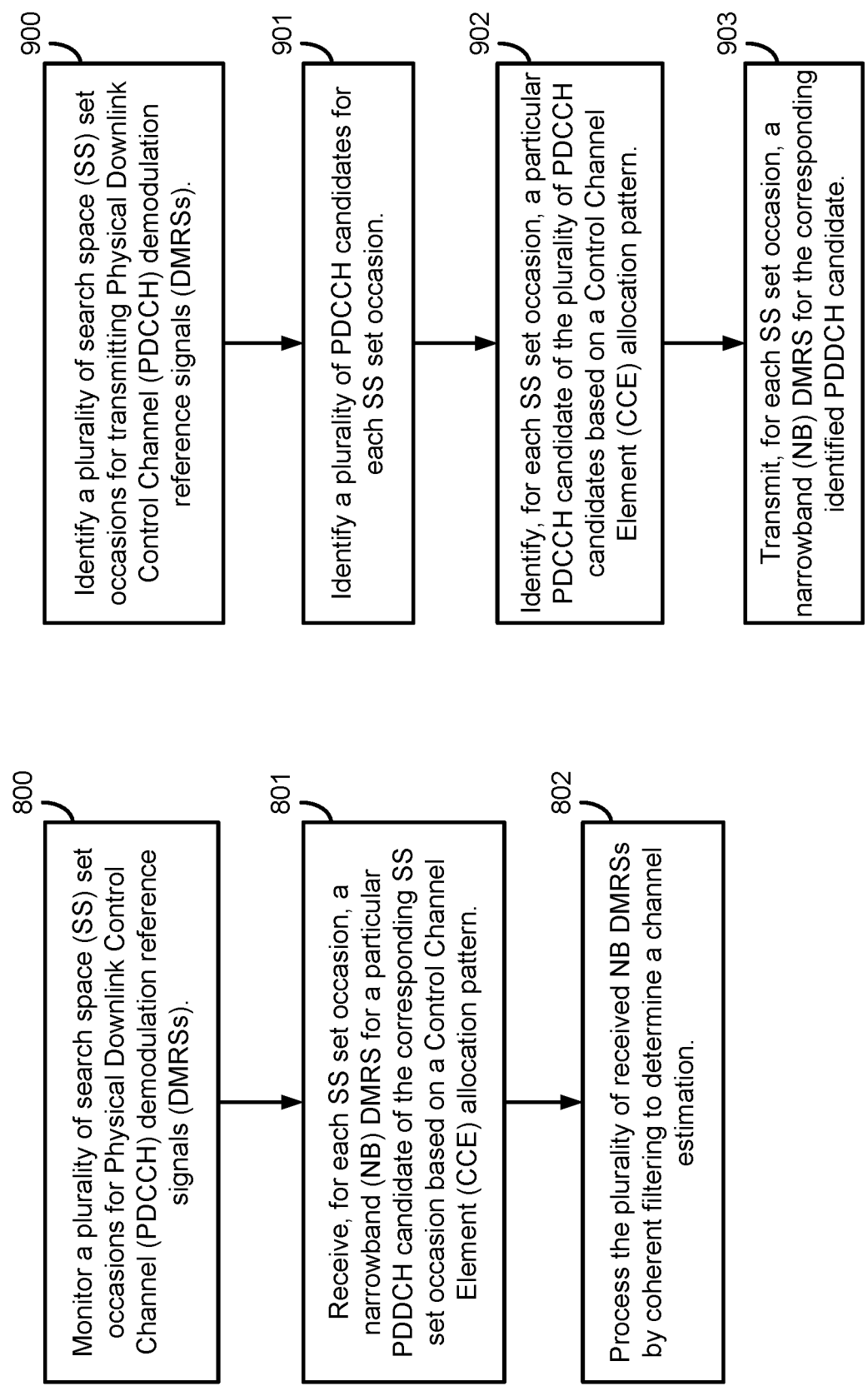

NARROWBAND PDCCH DMRS BUNDLING WITH ENHANCED COVERAGE

CROSS-REFERENCE TO RELATED APPLICATIONS

This application claims the benefit of a U.S. Provisional Patent Application No. 62/866,494, entitled, "Narrowband PDCCH DMRS Bundling with Enhanced Coverage," filed on Jun. 25, 2019, which is expressly incorporated by reference herein in its entirety.

TECHNICAL FIELD

Aspects of the present disclosure relate generally to wireless communication systems, and more particularly, to narrowband demodulation reference signal bundling for physical downlink control channels, including PDCCH repetition. Certain embodiments of the technology discussed below can enable and provide wireless communication devices and systems enhanced channel estimation accuracy and efficient communication.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes monitoring, by a user equipment (UE), a plurality of search space (SS) set occasions for Physical Downlink Control Channel (PDCCH) demodulation reference signals (DMRSs), receiving, by the UE for each SS set occasion, a narrowband (NB) DMRS for a particular PDCCH candidate of the corresponding SS set occasion based on a Control Channel Element (CCE) allocation pattern, and processing, by the UE, the plurality of received NB DMRSs by coherent filtering to determine a channel estimation.

In another aspect of the disclosure, a method of wireless communication includes identifying, by a base station, a plurality of search space (SS) set occasions for transmitting Physical Downlink Control Channel (PDCCH) demodulation reference signals (DMRSs), identifying, by the base station, a plurality of PDCCH candidates for each SS set occasion, identifying, by the base station for each SS set occasion, a particular PDCCH candidate of the plurality of PDCCH candidates based on a Control Channel Element (CCE) allocation pattern, and transmitting, by the base station for each SS set occasion, a narrowband (NB) DMRS for the corresponding identified PDCCH candidate.

In an additional aspect of the disclosure, an apparatus configured for wireless communication includes means for monitoring, by a user equipment (UE), a plurality of search space (SS) set occasions for Physical Downlink Control Channel (PDCCH) demodulation reference signals (DMRSs), means for receiving, by the UE for each SS set occasion, a narrowband (NB) DMRS for a particular PDCCH candidate of the corresponding SS set occasion based on a Control Channel Element (CCE) allocation pattern, and means for processing, by the UE, the plurality of received NB DMRSs by coherent filtering to determine a channel estimation.

In an additional aspect of the disclosure, an apparatus configured for wireless communication includes means for identifying, by a base station, a plurality of search space (SS) set occasions for transmitting Physical Downlink Control Channel (PDCCH) demodulation reference signals (DMRSs), means for identifying, by the base station, a plurality of PDCCH candidates for each SS set occasion, means for identifying, by the base station for each SS set occasion, a particular PDCCH candidate of the plurality of PDCCH candidates based on a Control Channel Element (CCE) allocation pattern, and means for transmitting, by the base station for each SS set occasion, a narrowband (NB) DMRS for the corresponding identified PDCCH candidate.

In an additional aspect of the disclosure, a non-transitory computer-readable medium having program code recorded thereon. The program code further includes code to program code executable by a computer for causing the computer to monitor, by a user equipment (UE), a plurality of search space (SS) set occasions for Physical Downlink Control Channel (PDCCH) demodulation reference signals (DMRSs), program code executable by a computer for causing the computer to receive, by the UE for each SS set occasion, a narrowband (NB) DMRS for a particular PDCCH candidate of the corresponding SS set occasion based on a Control Channel Element (CCE) allocation pattern, and program code executable by a computer for causing the computer to process, by the UE, the plurality of received NB DMRSs by coherent filtering to determine a channel estimation.

In an additional aspect of the disclosure, a non-transitory computer-readable medium having program code recorded thereon. The program code further includes code to identify, by a base station, a plurality of search space (SS) set occasions for transmitting Physical Downlink Control Channel (PDCCH) demodulation reference signals (DMRSs), program code executable by a computer for causing the computer to identify, by the base station, a plurality of PDCCH candidates for each SS set occasion, program code executable by a computer for causing the computer to identify, by the base station for each SS set occasion, a particular PDCCH candidate of the plurality of PDCCH candidates based on a Control Channel Element (CCE) allocation pattern, and program code executable by a computer for causing the computer to transmit, by the base station for each SS set occasion, a narrowband (NB) DMRS for the corresponding identified PDCCH candidate.

In an additional aspect of the disclosure, an apparatus configured for wireless communication is disclosed. The apparatus includes at least one processor, and a memory coupled to the processor. The processor is configured to receive, by the UE for each SS set occasion, a narrowband (NB) DMRS for a particular PDCCH candidate of the corresponding SS set occasion based on a Control Channel Element (CCE) allocation pattern, and to process, by the UE, the plurality of received NB DMRSs by coherent filtering to determine a channel estimation In an additional aspect of the disclosure, an apparatus configured for wireless communication is disclosed. The apparatus includes at least one processor, and a memory coupled to the processor. The processor is configured to identify, by a base station, a plurality of search space (SS) set occasions for transmitting Physical Downlink Control Channel (PDCCH) demodulation reference signals (DMRSs), to identify, by the base station, a plurality of PDCCH candidates for each SS set occasion, to identify, by the base station for each SS set occasion, a particular PDCCH candidate of the plurality of PDCCH candidates based on a Control Channel Element (CCE) allocation pattern, and to transmit, by the base station for each SS set occasion, a narrowband (NB) DMRS for the corresponding identified PDCCH candidate.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a diagram illustrating control channel element allocation for a search space set, according to aspects of the present disclosure.

FIG. 5B is a diagram illustrating a physical domain of another example of narrowband demodulation reference signal bundling for repetition of physical downlink control channels in common search space, in accordance with various aspects of the present disclosure.

FIG. 6A is a diagram illustrating an example of narrowband demodulation reference signal bundling for repetition of physical downlink control channels in user equipment specific search space, in accordance with various aspects of the present disclosure.

FIG. 8 is a block diagram illustrating example blocks executed by a UE configured according to an aspect of the present disclosure.

FIG. 9 is a block diagram illustrating example blocks executed by a base station configured according to an aspect of the present disclosure.

DETAILED DESCRIPTION

Figure 1:
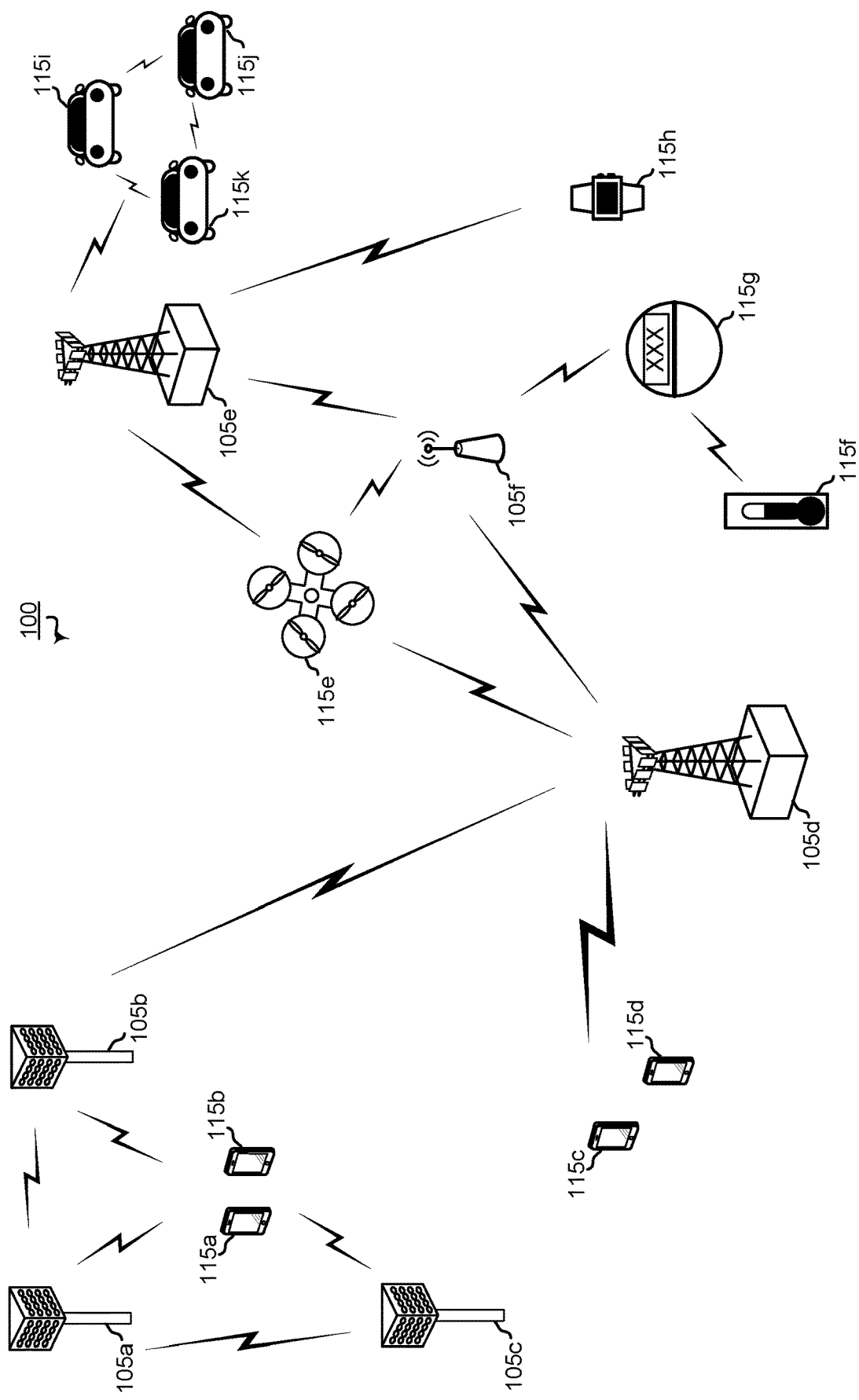
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
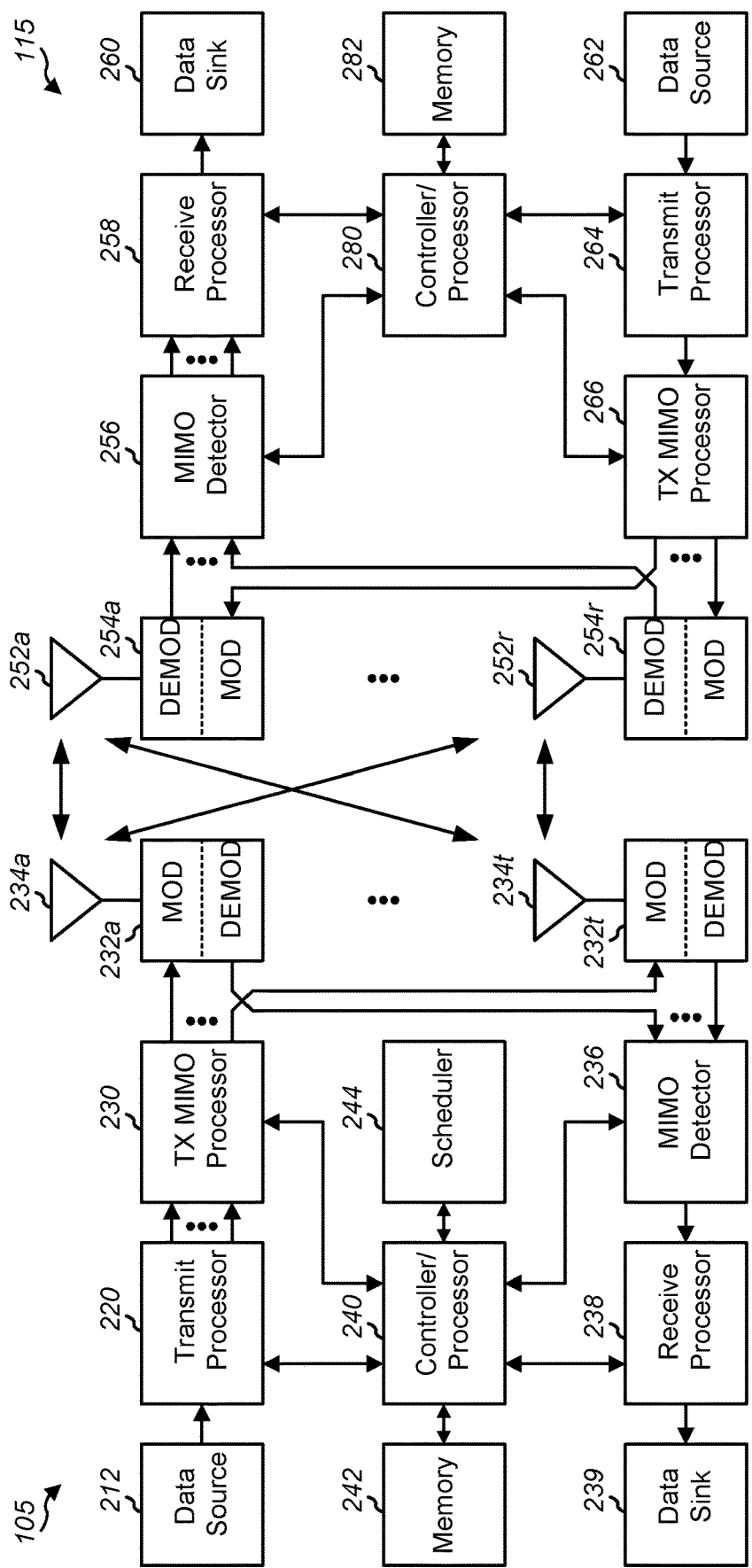
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Aspects of the present disclosure provide apparatus, methods, processing systems, and computer readable mediums for transmitting demodulation reference signals (DMRSs) with control channels (e.g., physical downlink control channels (PDCCHs)) that enable receiving devices to bundle (e.g., coherently combine) the DMRSs over time. In wireless communications systems, DMRSs can be coherently transmitted over different time instants. At the receiver, estimates of the channel determined based on DMRSs in different time instants can be coherently combined to enhance the channel estimation performance. DMRS bundling is more straightforward for DMRSs transmitted in association with physical downlink shared channels (PDSCHs), tracking reference signals (TRS) and channel state information (CSI) reference signals (CSI-RS). However, bundling of DMRS in association with PDCCHs is not as straightforward, due to the allocation of control channel elements (CCEs) of each PDCCH across the downlink bandwidth to which a receiving user equipment (UE) is blind, i.e., the PDCCHs are not signaled. That is, a UE is not aware that a CCE is used to transmit the payload of a PDCCH for the UE in a bandwidth part (BWP) until the UE blindly detects the PDCCH, which implies that the UE does not know whether a DMRS is present in the BWP unless the UE successfully detects and/or decodes a PDCCH in that BWP.

According to previously known techniques, configuration of DMRSs to be transmitted with PDCCHs is on a per control resource set (CORESET) basis. A configuration of the DMRSs may include whether the DMRSs are narrowband (NB) or wideband (WB). For example, narrowband may be indicated by a precoderGranularity information element in a radio resource control (RRC) configuration with value sameAsREG-bundle and wideband may be indicated by the Information Element (IE) with value allContiguousRBs in an RRC CORESET configuration. Additionally, a scrambling identifier (ID) for generating a DMRS scrambling sequence may be configured by a pdcch-DMRS-ScramblingID IE. If a pdcch-DMRS-ScramblingID is not configured, then a UE may use the physical layer cell ID as a scrambling ID for receiving the PDCCH DMRS.

In some communications systems, such as NR, a user equipment (UE) may receive a plurality of demodulation reference signal (DMRS) transmissions, which may be referred to as DMRSs, associated with a plurality of different time intervals, and may perform DMRS time domain bundling to improve an accuracy of channel estimation by coherently filtering the plurality of DMRS transmissions. In conventional systems with WB DMRS, a base station may transmit a DMRS in a segment of contiguous resource blocks allocated to a control resource set (CORESET) when at least one resource element group (REG) bundle of a physical downlink control channel (PDCCH) conveying the DMRS is transmitted in the segment of contiguous resource blocks (RBs) in a physical domain.

Each REG may include an RB (e.g., a single RB) during an orthogonal frequency division multiplexing (OFDM) symbol (e.g., a single OFDM symbol). REGs correspond to the physical resource domain and each REG of a CORESET may be indexed with an increasing index value (e.g., increasing in connection with time, such that a REG including a sequentially first OFDM symbol and a lowest-indexed RB in CORESET is indexed 0). A REG bundle may be a smallest physical resource unit allocatable to a PDCCH and may include a plurality of consecutive REGs, such as 2 REGs, 3 REGs, or 6 REGs (the quantity of REGs in a REG bundle may be configured on a per CORESET basis).

A physical resource of one or more REGs (e.g., 6 REGs) may correspond to a control-channel element (CCE), which is a resource of a virtual resource domain. In the aspects descried herein, each PDCCH may be assigned to a particular quantity of consecutive CCEs (CCE index values) where the particular quantity is an aggregation level for the PDCCH. Thus, a CCE is a virtual resource domain resource that maps to one or more REGs (e.g., a REG bundle) in a physical resource domain in accordance with a CCE-to-REG mapping function for distributive or sequential mapping. For example, each CCE may map to 3 REGs (e.g., for a REG bundle size of 2), 2 REGs (e.g., for a REG bundle size of 3), or 1 REG (e.g., for a REG bundle size of 6). During resource allocation for a PDCCH, a set of continuously numbered CCEs may be assigned to the PDCCH, and the assigned set of continuously numbered CCEs may be mapped to REG bundles associated with physical time resources and frequency resources of a frequency resource grid.

A CORESET may define a set of frequency domain RB allocations and OFDM symbol time domain allocations of a control region for PDCCH monitoring. The CORESET may be organized into a plurality of search space (SS) set occasions. The plurality of SS set occasions may be associated with an SS set configuration that indicates a time domain pattern, periodicity, quantity of slots, quantity of symbols, and/or the like for monitoring for the PDCCH in a particular SS set of the CORESET. Each slot of the CORESET may be configured with one or more of SS set occasions which may, collectively, form the SS set for PDCCH monitoring. Each SS set may be configured with a set of aggregation levels and a quantity of PDCCH candidates for each aggregation level. A base station may select one or more of the PDCCH candidates of one or more aggregation levels for transmitting a PDCCH (e.g., downlink control information (DCI)) and the UE may monitor all of the PDCCH candidates of each aggregation level to attempt to receive the DCI.

However, when the base station transmits a PDCCH in a plurality of adjacent SS set occasions (e.g., of the same SS set or of a plurality of different SS sets within the same CORESET), the base station may select any PDCCH candidate in which to transmit the PDCCH and may use a common elements and/or phase continuous elements for transmission, such as carrier phase continuity, precoding matrix phase continuity, same precoding matrix (aka precoder), or a combination thereof For example, with regards to PDCCH candidate selection, for a group of 4 SS sets each including 4 PDCCH candidates, the base station may transmit a first PDCCH in a first PDCCH candidate of a first SS set occasion, a second PDCCH in a first PDCCH candidate of a second SS set occasion, a third PDCCH in a first PDCCH candidate of a third SS set occasion, and a fourth PDCCH in a first PDCCH candidate of a fourth SS set occasion. In this case, each PDCCH may be associated with a DMRS and is located or transmitted in the same location within each SS set occasion (and possible slot), i.e., has the same CCE index values. As a result of transmitting the PDCCH in the same PDCCH candidates of adjacent SS set occasions and using common elements and/or phase continuous elements for transmission, the UE may be to perform coherent filtering of the estimated channel on the DMRSs of the PDCCH, thereby increasing an accuracy of channel estimation.

In some implementations, PDCCH DMRS time domain bundling comprises transmitting PDCCH DMRS over multiple search space set occasions with carrier phase continuity and the same precoding matrix. In a particular implementation, PDCCH DMRS time domain bundling comprises transmitting PDCCH DMRS over multiple search space set occasions with carrier phase continuity and the same precoding matrix.

Such PDCCH DMRS with time domain bundling over multiple SS set occasions can be coherently filtered. The filtered channel estimate can have a better quality than the one that is estimated only based on PDCCH DMRS received from a single SS set occasion.

PDCCH DMRS can be transmitted in narrow band (NB) or wideband (WB) mode. For each mode, the configuration of the PDCCH DMRS is based on a CORESET.

In conventional PDCCH DMRS for wideband modes, WB DMRS is transmitted in a whole segment of contiguous RBs allocated to the CORESET if any part of the PDCCH is transmitted in the segment. The same precoder is used for each WB DMRS in the segment of contiguous RBs. The precoder may be set by RRC configuration, e.g., precoderGranularity=allContiguousRB. In some such WB implementations, WB PDCCH DMRS is transmitted in all DMRS resource element (RE) locations configured for the CORESET in SS set occasions that are time domain bundled.

In conventional PDCCH DMRS for narrowband modes, NB PDCCH DMRS is transmitted in (only the) RBs constituting the PDCCH. The same precoder is used for each NB DMRS in the resource element group (REG) bundle of the PDCCH. The precoder may be set by RRC configuration, e.g., precoderGranularity=sameAsREG-bundle. In some such conventional NB implementations, NB PDCCH DMRS is transmitted within the union of REGs allocated to all PDCCH candidates in the physical domain to enable PDCCH DMRS bundling.

In the aspects described herein, PDCCH DMRS time domain bundling is performed in the virtual domain and can be extended to NB DMRS for PDCCH repetition for UE coverage enhancement. Additionally, the techniques described herein, such as virtual domain alignment of PDCCH DMRSs, can be used without (independent of) PDCCH repetition to provide coverage enhancement. For example, PDCCH DMRS time domain bundling can be performed in the virtual domain when unique PDCCHs are transmitted.

PDCCH repetition corresponds to encoding and transmitting the same PDCCH payload multiple times. At the receiver, LLRs (log likelihood ratio, aka soft bits) of the received transmissions of the PDCCH repetitions can be combined to increase PDCCH decoding rate. PDCCH repetitions can also be used to enhance coverage for signal blockage and congestions. For example, when downlink (DL) signal to noise ratio (SNR) is too low for a UE to properly decode a PDCCH, even when transmitted at highest settings (e.g., maximum aggregation level), a base station my repeat the PDCCH such that the UE can combine the PDCCH repetitions to properly decode the PDCCH or otherwise redundantly decode the PDCCH. As another example, sometimes there are not enough network resources to support a high or needed aggregation level to enable reliable decoding by a UE, because of congestion, many devices, etc. In such situations, PDCCH repetition can be used to increase reliability and/or enable decoding without increasing other settings (e.g., aggregation level) or allocating more network resources to the UE.

In some implementations, the PDCCH repetitions can be transmitted in search space set occasions of more than one search space set. In other implementations, the PDCCH repetitions are transmitted in search space set occasions of the same search space set.

Figure 3:
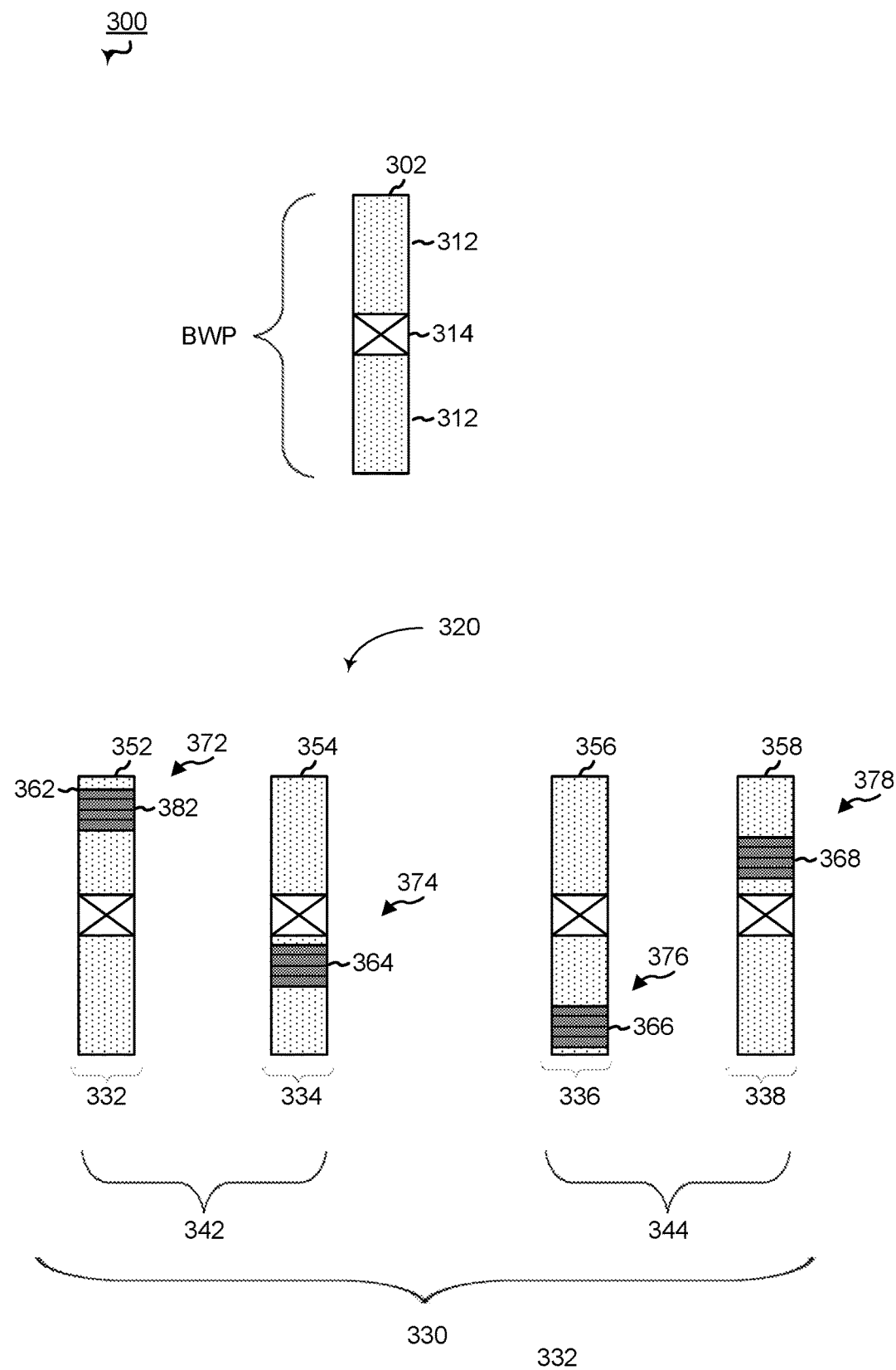
FIG. 3 is a diagram illustrating an exemplary search space set, according to aspects of the present disclosure.

Referring to FIG. 3, a diagram 300 illustrating a portion of a control region and aspects thereof in a virtual resource domain. In FIG. 3, a control resource set (CORESET) is illustrated. A CORESET defines a building block 302 (e.g., frequency domain Resource Block (RB) allocations and time domain size in number of OFDM symbols, 1 to 3 symbols) of a control region for PDCCH monitoring.

Search space (SS) set configuration contains the time domain pattern including the periodicity, slots in the periodicity and symbols in a slot where the PDCCH is monitored. One or more SS set occasions of the same or different SS set can be configured in a slot. CORESET and SS set jointly define time and frequency resources for PDCCH transmissions. Building block 302 corresponds to a bandwidth part (BWP) and includes one or more portions dedicated to the CORESET and one or more portions not dedicated to the CORESET. As illustrated in FIG. 3, building block 302 includes two portions 312 dedicated to the CORESET before and after a single, middle portion 314 not dedicated to the CORESET. Portions 312 may include or correspond to a plurality of contiguous physical resources (i.e., REGs) that can be mapped to control channel elements (CCEs) (e.g., virtual resource blocks) that are allocated to the CORESET. In narrowband modes, such portions 312 may support PDCCH transmissions and DMRS transmissions. Portion 314 may include or correspond to physical resources (i.e., REGs) that are not mapped to CCEs (e.g., virtual resource blocks) that are allocated to the CORESET. Thus, in narrowband and wideband modes, such portion 314 cannot support PDCCH transmissions or DMRS transmissions. In a corresponding physical domain, the CCEs map to one or more REGs (e.g., plurality of contiguous RBs).

Each such building block is referred to as SS set occasion of a SS set 330. As illustrated in diagram 320, SS set 330 includes four SS set occasions, SS set occasions 332-338. Additionally, SS set 330 includes two slots, slots 342, 344, and two SS set occasions per slot. Specifically, first slot 342 includes first SS set occasion 332 and second SS set occasion 334, and second slot 344 includes third SS set occasion 336 and fourth SS set occasion 338. Although the SS set 330 of FIG. 3 includes two SS set occasions per slot, in other implementations each SS set may correspond to its own slot, i.e., each slot includes one SS set occasion.

First SS set occasion 332 includes building block 352. Building block 352 includes a first PDCCH 362 (i.e., first PDCCH transmission or signal) at a first location 372. Additionally, first PDCCH 362 includes a first DMRS 382. As illustrated in FIG. 3, the first DMRS 382 (i.e., symbols thereof) may be interleaved in the first PDCCH 362. Alternatively, a DMRS, such as the first DMRS 382 (i.e., symbols thereof), may be contiguous in the first PDCCH 362.

Second SS set occasion 334 includes building block 354. Building block 354 includes a second PDCCH 364 (i.e., second PDCCH transmission or signal) at a second location 374. Second PDCCH 364 includes a second DMRS. Third SS set occasion 336 includes building block 356. Building block 356 includes a third PDCCH 366 (i.e., third PDCCH transmission or signal) at a third location 376. Third PDCCH 366 includes a third DMRS.

Fourth SS set occasion 338 includes building block 358. Building block 358 includes a fourth PDCCH 368 (i.e., fourth PDCCH transmission or signal) at a fourth location 378. Fourth PDCCH 368 includes a fourth DMRS. As illustrated in FIG. 3, each location 372-378 of the PDCCHs 362-368 (and corresponding DMRSs) is unique or different from each of the other locations 372-378. In FIG. 3, each location 372-378 is fully unique, no partial overlapping. Starting locations (e.g., symbols) of SS set occasions 332-338 in a slot may be configured by a bitmap. Additionally, FIG. 3 does not show complete periodicity of SS set configuration of the SS set 330, and the limited representative example illustrated in FIG. 3 has a starting symbol bitmap that contains 2 non-zero bits.

In FIG. 3, each payload of the PDCCHs 362-368 may be the same or different. Different payloads are used when PDCCH repetition is not enabled, and the same payload (e.g., payload data) is used when PDCCH repetition is enabled. PDCCH repetitions may have different preambles or other portions. In some implementations, an encoded payload of a PDCCH is transmitted in a single SS set occasion and it occupies all symbols of the SS set occasion.

A PDCCH may be repeated by using particular PDCCH candidates selected from a group of all PDCCH candidates, i.e., possible occasions for PDCCH transmissions. An example equation for determining PDCCH candidates and an example table of PDCCH candidates is illustrated and described further with reference to FIG. 4

Referring to FIG. 4, an example equation 400 for determining PDCCH candidate location and an example table 450 of PDCCH candidate locations are illustrated. Equation 400 may include or correspond to an equation or formula specified by 3GPP specifications, such as, for example, the equation specified in TS 38.213. Equation 400 generates or identifies the CCE index value for which each PDCCH candidate begins in each SS set occasion.

In each SS set, a set of Aggregation Levels (ALs) is configured. A PDCCH is transmitted in a number (L) of consecutive CCEs, where L is the Aggregation Level. At each Aggregation Level (AL), a number of PDCCH candidates are configured. PDCCH candidates correspond to possible PDCCH occasions (e.g., all possible occasions) where a PDCCH may be transmitted. A base station (e.g., gNB) can pick any PDCCH candidate of the number of PDCCH candidates to transmit the actual PDCCH, such as a PDCCH signal, PDCCH data, a PDCCH message, a DCI, etc. The UE may blindly decode all PDCCH candidates on all ALs. To illustrate, the UE may assume that the PDCCH candidates have been picked randomly and the UE may attempt to decode PDCCH candidates with different lengths (different numbers of consecutive CCEs).

The base station, and optionally the UE, determines the location for each PDCCH candidate in the SS set, i.e., determines the set of CCEs for each PDCCH candidate. For each AL and corresponding L or length of PDCCH candidate in CCEs, the corresponding PDCCH candidates may be roughly distributed in the CCE domain. A starting or first CCE of a PDCCH candidate may correspond to a multiple of L CCEs. Thus, in some implementations, CCEs of PDCCH candidates with the same AL may not partially overlap each other (e.g., any other PDCCH candidate). A PDCCH candidate may fully overlap one or more other PDCCH candidates with the same AL.

For Common Search Spaces (CSSs), the CCE Offset is zero (0), and for UE Specific Search Spaces (USSs), the CCE Offset changes. For example, in USS modes, the CCE Offset may change for each SS set occasion and/or slot.

As CCEs (or CCE index values) are in a CCE domain or Virtual Domain, the CCEs are mapped or translated to a Physical Resource Domain (e.g., Resource Element (RE) Domain or Resource Grid). The CCEs may be mapped or translated to REGs or RB. Additionally, in some implementations, when mapping the CCEs to the Physical Resource Domain, the CCEs may be interleaved or otherwise mapped such that adjacent CCEs in the CCE domain are not transmitted in adjacent physical resources (e.g., REGs or RBs) of the Physical Resource Domain. In some implementations, the mapping of PDCCH CCEs can only distribute resources allocated in CCE domain, and cannot shuffle the ordering of the resources even if REG interleaving is enabled.

For a search space (SS) set s associated with a CORESET p, the CCE indexes for aggregation level L corresponding to PDCCH candidate $m\_(s,n\_CI)$ of the search space set in slot $n\_(s,f)^\mu$ for an active downlink BWP of a serving cell corresponding to carrier indicator field value $n\_CI$ are given by equation 400 of FIG. 4. In equation 400, $N\_(CCE,p)$ is the number of CCEs, numbered from 0 to $N\_(CCE,p)-1$, in CORESET p; $n\_CI$ is the carrier indicator field value if the UE is configured with a carrier indicator field by CrossCarrierSchedulingConfig for the serving cell on which PDCCH is monitored; otherwise, including for any CSS, $n\_CI=0$. The term $m\_(s,n\_CI)=0, \ldots M\ (s,max)^{((L))}-1$, where $M\_(s,max)^{((L))}$ is the number of PDCCH candidates the UE is configured to monitor for aggregation level L of a search space set s for a serving cell corresponding to $n\_CI$.

In CSS modes, variable 402 is zero and in variable 404 "max" is zero (i.e., from s to 0). In USS modes, variable 402 is not equal to zero and is equal to $(A \cdot Y\_(p,n\ (s,f)^\mu-1))$ modD, $Y\_(p,-1)=n\_RNTI \neq 0$, $A\_p=39827$ for pmod3=0, $A\_p=39829$ for pmod3=1, $A\_p=39839$ for pmod3=2, and D=65537. Additionally, i covers a range of values of i=0, ... L−1; the RNTI value used for $n\_RNTI$ is the C-RNTI. Furthermore, in USS modes, variable 404 is the maximum of $M\_(s,n\_CI)^{((L))}$ over all configured $n\_CI$ values for a CCE aggregation level L of search space set s.

Thus, for the common search space (CSS), because the CCE offset is always 0, the set of CCEs allocated to the set of PDCCH candidates at an aggregation level is identical across SS set occasions in different slots. Alternatively, for the UE specific search space (USS), because the CCE offset changes from slot to slot, the set of CCEs allocated to the set of PDCCH candidates at an aggregation level is identical across SS set occasions within the same slots, but changes from slot to slot. An exemplary table 450 for an example representative USS mode is illustrated in FIG. 4.

Table 450 is a table of values generated by equation 400. Table 450 includes CCE index values corresponding to PDCCH candidates for a particular CCE offset. In Table 450, the CCE index values range from 0 to 79, the CCE offsets 472-478 (4 values, 0-3) are depicted in columns, and the PDCCH candidates 462-468 (4, 0-3) are depicted in rows. The corresponding CCE index values for the various combinations of the CCE offsets 472-478 and the PDCCH candidates 462-468 are illustrated in the interior of Table 450. For example, for a first CCE offset 472 (0) and a first PDCCH candidate 462 (0), the corresponding CCE index values are 0 to 7. That is, a PDCCH may be sent in a corresponding first SS set occasion that has the first CCE offset 472 starting at CCE index 0 and ending at CCE index 7 (i.e., transmitted during REGs corresponding to the CCE index values). As another example, for a fourth PDCCH candidate 468 (3) with the first CCE offset 472, the corresponding CCE index values are 56 to 63. That is, a PDCCH may be sent in the corresponding first SS set occasion that has the first CCE offset 472 starting at CCE index 56 and ending at CCE index 63 (i.e., transmitted during REGs corresponding to the CCE index values).

In Table 450, the example has an Aggregation Level of 8 (AL=8) and a number of PDCCH candidates of 4 (e.g., a corresponding number of PDCCH candidates for AL8 may be 4). Such configuration may produce a total number of CCEs (CCE index values) of 80 and have a carrier index of zero (0).

Figure 5A:
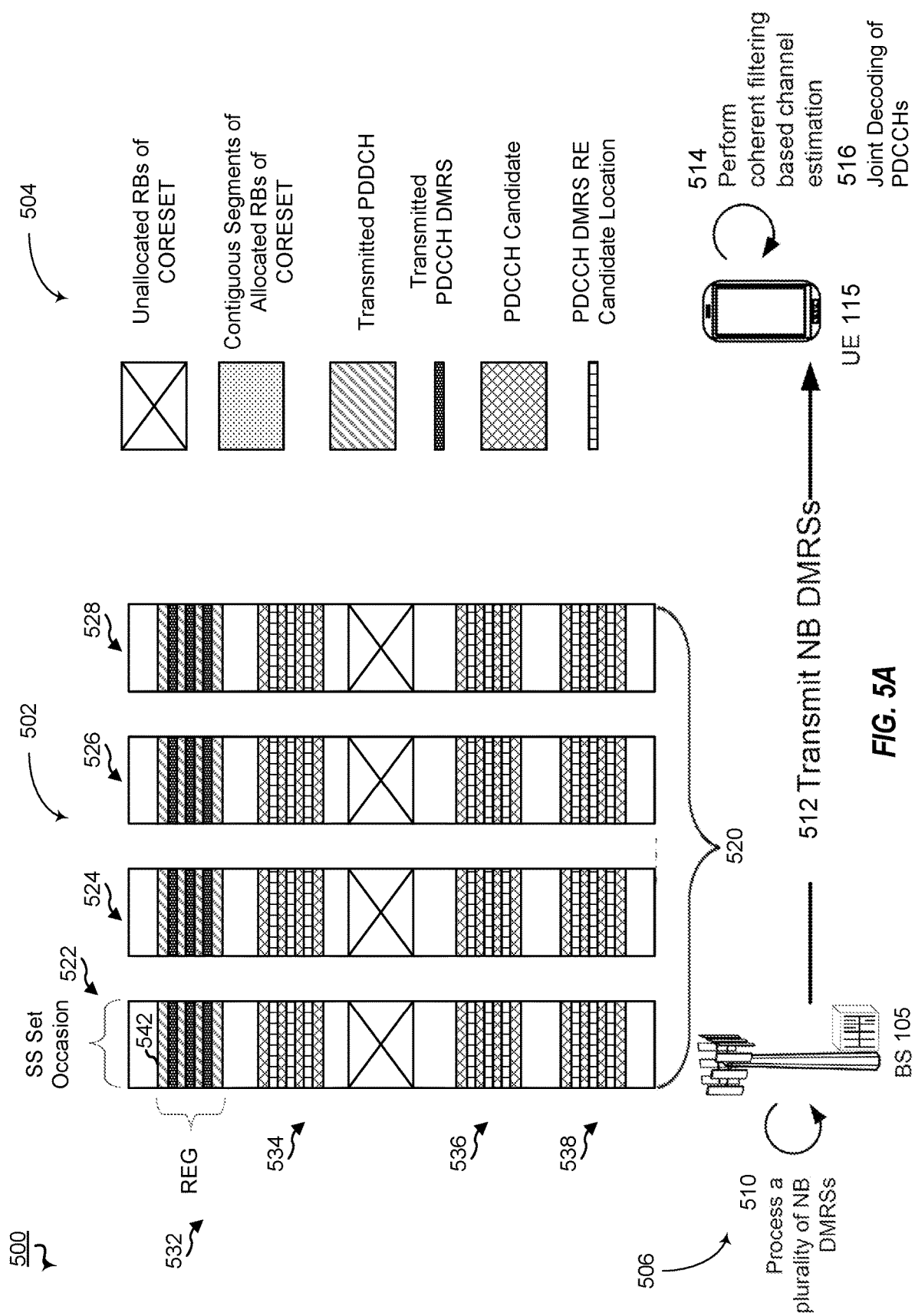
FIG. 5A is a diagram illustrating an example of narrowband demodulation reference signal bundling for repetition of physical downlink control channels in common search space, in accordance with various aspects of the present disclosure.

Referring to FIGS. 5A and 5B, examples of NB PDCCH DMRS bundling in a Common Search Space (CSS) (e.g., CSS mode) are illustrated. Referring to FIG. 5A, an example of NB PDCCH DMRS bundling in a CSS (or CSS mode) is illustrated. In FIG. 5, four SS set occasions are illustrated as physical domain 502 (e.g., a portion of a physical domain). A corresponding legend 504 is also depicted for understanding the diagram of the physical domain 502. Additionally, a corresponding schematic diagram 506 of NB PDCCH DMRS repetition transmission and reception is also illustrated.

Physical domain 502 illustrates a first SS set 520 including four SS set occasions 522-528. Each of the SS set occasions 522-528 include four PDCCH candidate locations, i.e., four possible PDCCH locations in which PDCCHs may be transmitted. Each of the PDCCH candidate locations 532-538 are aligned, i.e., aligned vertically across the SS set occasions 522-528.

The SS set occasions 522-528 may be included in one or more slots. When the SS set occasions 522-528 are included in two or more slots, the two or more slots that include the SS set occasions 522-528 may correspond to contiguous slots or non-contiguous slots. In other implementations, the four SS set occasions 522-528 are included in two or more SS sets (e.g., first SS set 520 and second SS set).

Legend 504 depicts RB's that are not allocated to the CORESET, segments of contiguous RBs that are allocated to the CORESET, transmitted PDCCHs, transmitted DMRS of the PDCCHs, PDCCH candidates (without a transmitted PDCCH), and DMRS locations of the PDCCH candidates (without a transmitted PDCCH).

Schematic diagram 506 depicts a base station (BS) 110 and a UE 115. Base station 110 processes a plurality of NB DMRSs for PDCCH repetitions at 510 and transmits the plurality of NB DMRSs for the PDCCH repetitions at 512. The UE 115 receives the plurality of NB DMRSs for the PDCCH repetitions and performs coherent filtering for the plurality of NB DMRSs for the PDCCH repetitions at 514 and performs joint decoding of the PDCCH repetitions at 516.

The coherent filtering at 514 may include performing, by the UE 115, channel estimation on DMRS in each SS set occasion to generate preliminary channel estimates, and coherently filtering, by the UE 115, the preliminary channel estimates to generate a coherently filtered channel estimate. The joint decoding of the PDCCH repetitions at 516 may include receiving, by the UE 115, a corresponding PDCCH transmission based on the CCE allocation pattern, wherein each PDCCH has the same payload data, generating, by the UE 115, a log likelihood ratio for each PDCCH, combining, by the UE 115, the log likelihood ratios of the PDCCHs to generate a combined log likelihood ratio, and decoding, by the UE 115, the corresponding PDCCH based on the combined log likelihood ratio.

Referring to FIG. 5B, a portion of another example of a physical domain 502a is illustrated. Similar to physical domain of FIG. 5A, physical domain 502a includes the same PDCCH candidates (same CCE locations in the virtual domain). However, in FIG. 5B, the fourth PDCCH candidates 538 of the fourth location include the PDCCH transmissions 542 and corresponding DMRS. In FIG. 5B, each of the PDCCH transmissions 542 correspond to the same data or payload, that is PDCCH repetitions is enabled and the transmitted PDCCHs 542 correspond to PDCCH repetitions.

FIG. 5B further illustrates that in addition to or in the alternative of, NB PDCCH DMRS bundling for PDCCH repetition can use other PDCCH candidates and locations. In both FIGS. 5A and 5B, each of the PDCCH repetition transmissions and corresponding DMRS transmissions have the same CCE location such that a UE can coherently decode the PDCCH repetitions together. Similarly, in both FIGS. 5A and 5B, CCE location of the PDCCH repetition transmissions and corresponding DMRS transmissions is selected or identified based on PDCCH candidate number (e.g., 462-468), such as the candidate index number in the SS set occasions where PDCCH DMRS is bundled in the time domain. Accordingly, the CCE location for a particular PDCCH candidate is the same for each SS set occasion because the CCE offset is zero in the CSS (CSS modes). Thus, PDCCH candidate number can be used to determine PDCCH and DMRS location for PDCCH repetitions. In particular, the same PDCCH candidate number (e.g., candidate index number) can be used to determine PDCCH and DMRS location for PDCCH repetitions in each SS set occasion and/or slot. When these transmissions of the PDCCH are demodulated, DMRS in the same CCEs are coherently filtered over the SS set occasions.

Figure 6B:
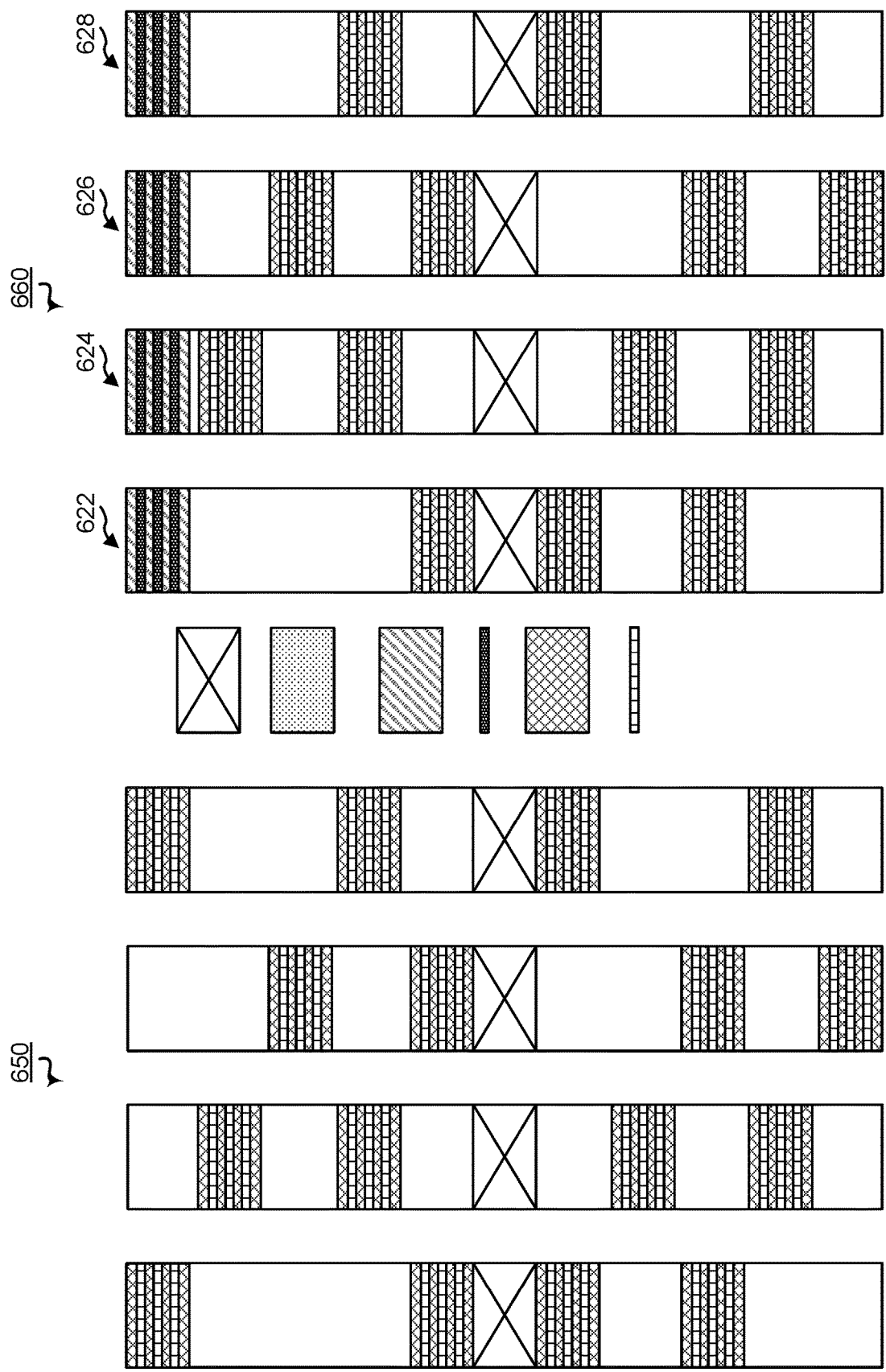
FIG. 6B is a diagram illustrating corresponding physical domains of the example of FIG. 6A.

Referring to FIGS. 6A and 6B, an example of NB PDCCH bundling in a UE-specific Search Space ((USS), or USS mode) set is illustrated. FIG. 6A illustrates a Table 600 depicting exemplary PDCCH CCE locations in a virtual domain for PDCCH repetitions in a SS set. FIG. 6B illustrates corresponding physical resources graphically illustrating the exemplary PDCCH CCE locations for PDCCH repetitions depicted in Table 600.

Referring to FIG. 6A, Table 600 is a table of values generated by equation 400. Table 600 is a table of CCE index values corresponding to PDCCH candidates for a particular PDCCH repetition. In Table 600, the CCE index values range from 0 to 79, the PDCCH repetitions 612-618 (4 values, 0-3) and are depicted in columns, and PDCCH candidates 602-608 (4 values, 0-3) are depicted in rows.

In Table 600, the example has an Aggregation Level of 8 (AL=8) and a number of PDCCH candidates of 4 (e.g., a corresponding number of PDCCH candidates for AL8 may be 4). Such configuration may produce a total number of CCEs (CCE index values) of 80 and have a carrier index of zero (0).

The corresponding CCE index values for the various combinations of the PDCCH repetitions 612-618 and the PDCCH candidates 602-608 are illustrated. For example, for a first PDCCH candidate 602 (0) for a first PDCCH repetition 612 (0) in a first SS set occasion and a first slot, the corresponding CCE index values are 0 to 7. That is, a PDCCH may be sent in a corresponding first SS set occasion (e.g., second row) of the first PDCCH repetition 612 starting at CCE index 0 and ending at CCE index 7 (i.e., transmitted during REGs corresponding to the CCE index values). As another example, for the first PDCCH candidate 602 (0) for a third PDCCH repetition 616 in a third SS set occasion and a third slot, the corresponding CCE index values are 16 to 23. That is, a PDCCH may be sent in a corresponding third SS set occasion (e.g., fourth row) of the third PDCCH repetition 616 starting at CCE index 16 and ending at CCE index 23 (i.e., transmitted during REGs corresponding to the CCE index values). As Table 600 corresponds to a USS or USS mode, the PDCCH repetitions 612-618 each have different CCE offsets in different slots, i.e., a particular PDCCH candidate with certain candidate index does not have the same CCE index values for each PDCCH repetition 612-618 (i.e., in each slot and/or SS set occasion) that is transmitted in this PDCCH candidate. To illustrate, the first PDCCH candidate 602 (0) has CCE values of 0 to 7, 8 to 15, and 16 to 23 (with CCE values 0 to 7 being used for first and fourth PDCCH repetitions 612, 618). Accordingly, a base station may generate (aka allocate) CCEs 622-628 in column 620 to transmit each PDCCH repetition. As illustrated in Table 600, allocated CCEs correspond to CCEs 0 to 7.

Additionally, in some implementations, as illustrated in table 600, each PDCCH repetition 612-618 may not have a common CCE location at all based on a CCE allocation formula, such as equation 400. To illustrate, only the first and fourth PDCCH repetitions 612, 618 have any PDCCH candidate (602-608) scheduled for CCE index values 0 to 7, and the second and third PDCCH repetitions 614 and 616 have no PDCCH candidates (602-608) scheduled for CCE index values 0 to 7. Accordingly, a base station may generate new allocations for one or more PDCCH candidates (602-608) for some PDCCH repetitions 612-618 to align CCE index values to form a pattern of CCE, referred herein to as a CCE Allocation Pattern. To illustrate, the base station allocates new CCE index values for the second and third PDCCH repetitions 614 and 616, as indicated in table 600 by cross-hatching. In FIGS. 5A, 5B, 6A, and 6B, the CCE Allocation Pattern is the same CCE index values across SS set occasions. In other implementations, other types of CCE Allocation Patterns may be used.

Referring to FIG. 6B, physical domain 650 (e.g., a portion thereof) and physical domain 660 (e.g., a portion thereof) are illustrated that correspond (through CCE-to-REG mapping) to the values of Table 600 of FIG. 6A. Physical domain 650 illustrates each of the PDCCH candidates 602-608 for each PDCCH repetition 612-618 of table 600. The PDCCH repetitions 612-618 may correspond to four different slots. The PDCCH repetitions 612-618 may be included in a single SS set or included in multiple SS sets (i.e., spread across two or more SS sets).

Specifically, physical domain 650 illustrates the four possible PDCCH candidate locations for each PDCCH candidate 602-608 and PDCCH repetition 612-618 combination prior to allocation of the allocated CCEs 622-628. In physical domain 650, one or more of the PDCCH candidate locations may overlap and no PDCCH candidates are aligned. Further, there is no common location among different PDCCH candidates 602-608 for each SS set occasion. Thus, a common location for PDCCH repetition transmissions is not available based on a PDCCH candidate 602-608 (e.g., CCE index locations thereof). A common location may be generated or alloacted based on a location of a particular PDCCH candidate 602-608.

Physical domain 660 illustrates the locations corresponding to the allocated CCEs 622-628 overlaid onto the locations of the possible PDCCH candidates 602-608 in physical domain 650. As illustrated in physical domain 660, allocated CCEs 622-628 are aligned in the virtual domain and in terms of physical resource in the physical domain, and as compared to physical domain 650, allocated CCEs 624, 626 were not previously allocated to any PDCCH candidate for their corresponding PDCCH repetition (second and third PDCCH repetitions 614 and 616).

Thus, for PDCCH repetition in the USS, if PDCCH DMRS bundling is enabled and NB DMRS is configured, the first transmission and one or more repeated transmissions of the PDCCH may be transmitted in the same set of CCEs in all SS set occasions where PDCCH DMRS is bundled in time domain. For example, allocated CCEs 624, 626 do not correspond to any (original) PDCCH candidate in some SS set occasions. Because of the slot dependent CCE offset in USS, the same PDCCH candidate index does not correspond to the same set of CCEs in different slots. Thus, allocated CCEs 622-628 are used to transmit the PDCCH repetitions.

As compared to FIGS. 5A and 5B, PDCCH candidate and DMRS location are generated based on a location of a particular PDCCH candidate and SS set occasion in FIGS. 6A and 6B. In FIGS. 5A and 5B, the PDCCH candidate and DMRS location is identified based on PDCCH candidate number (candidate index number). In both FIGS. 5A and 5B and 6A and 6B, the PDCCH transmissions and DMRS for PDCCH repetitions are aligned for each SS set occasion, such as aligned in time in the virtual domain, i.e., CCE index value. Alignment in the virtual domain may cause alignment in the physical domain.

In some implementations, because CCE allocation for PDCCH candidates changes from SS set occasion to SS set occasion or slot to slot in the USS, a reference may be used to determine the CCE allocation and pattern. For example, a predetermined or standards based configuration may be used to indicate the reference which identifies the CCE allocation and pattern. Such a reference may be precoded or preloaded prior to operation. As another example, a reconfigurable reference may be used. Such a reconfigurable reference may be signaled and modified by configuration message prior to and or during operation, such as by radio resource control (RRC) configuration message. The reference may include a reference SS set occasion, a reference slot, and/or a reference PDCCH candidate. For example, a first PDCCH candidate of a first slot (e.g., first PDCCH repetition) may be used. As another example, a last PDCCH candidate of a first (or other) SS set occasion may be used. As another example, CCE allocation of a first slot (or other slot) may be used for all slots involved in PDCCH NB DMRS bundling. As yet another example, CCE allocation of a first (or other) SS set occasion may be used for all SS set occasions involved in PDCCH NB DMRS bundling. Any combination or PDCCH candidate and repetition thereof may be used as the reference for CCE determination. The reference or references may be used by the base station, the UE, or both, to process PDCCH repetitions and corresponding DMRS in the USS for PDCCH DMRS bundling.

As an illustrative, non-limiting example, a base station may choose one transmission of the PDCCH repetition and determine the set of allocated CCEs in its SS set occasion using a CCE allocation rule defined in TS 38.213. The determined CCE allocation is used for all the other transmissions of the PDCCH repetition in their corresponding SS set occasions. For example, the chosen transmission can be the first transmission, the last transmission, or any transmission in between. Essentially, such a reference may function to define (or redefine) the CCE offset for USS modes when NB DMRS bundling is used for PDCCH (with or without repetitions).

Figure 7:
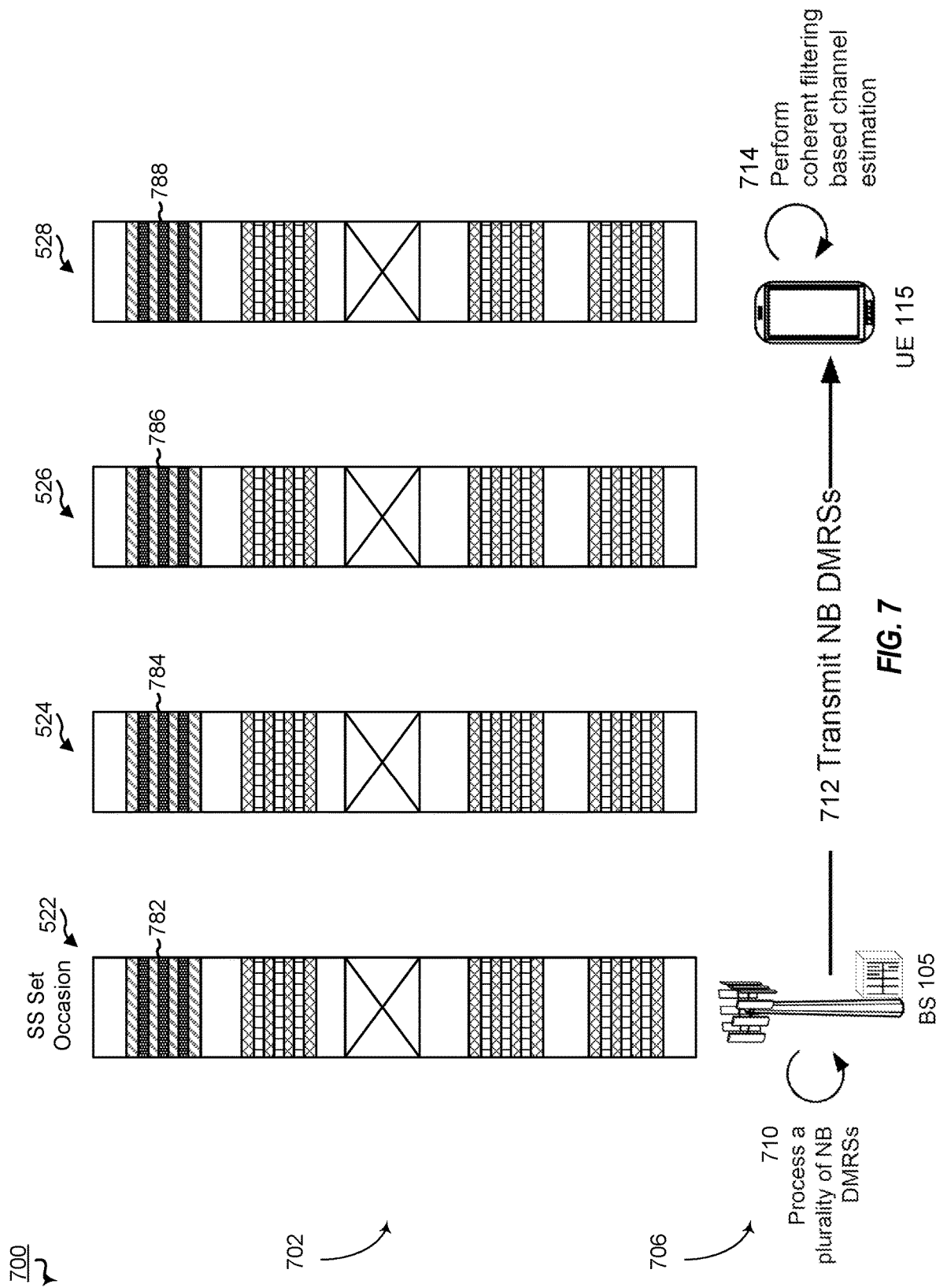
FIG. 7 is a diagram illustrating an example of narrowband demodulation reference signal bundling for physical downlink control channels, in accordance with various aspects of the present disclosure.

Although FIGS. 5A, 5B, 6A, and 6B describe NB DMRS bundling with respect to PDCCH repetition, repeating copies or retransmissions of PDCCHs where PDCCHs have at least the same payload or payload data, the techniques described herein (NB DMRS bundling) can be extended to PDCCH without repetition, as illustrated in FIG. 7. That is, NB DMRS bundling can be used where different PDCCHs are being transmitted by using the same CCEs of the SS set occasions or where the PDCCHs have different payloads or payload data in the same CCEs of the SS set occasions.

Referring to FIG. 7, an example diagram 700 illustrating physical resource of a SS set occasion for a CSS and schematic diagram 706 of NB PDCCH DMRS repetition transmission similar to FIG. 5A is illustrated. In FIG. 7, the PDCCH candidates have the same size and the PDCCH and NB DMRS transmissions have the same timing and CCE allocation pattern as in FIG. 5A. However, in FIG. 7, the PDCCH transmissions are different from one another. As illustrated in FIG. 7, PDCCHs transmissions 782-788 are different from one another. The PDCCHs transmissions 782-788 are transmitted in corresponding SS set occasions 522-528.

In schematic diagram 706, a base station (BS) 110 and a UE 115 are depicted. Base station 110 processes a plurality of NB DMRSs for PDCCHs transmissions 782-788 at 710 and transmits the plurality of NB DMRSs for the PDCCH 7 transmissions 782-788 at 712. The UE 115 receives the plurality of NB DMRSs for the PDCCH transmissions 782-788 and performs coherent filtering for the plurality of NB DMRSs for the PDCCH transmissions 782-788 at 714. Because the PDCCHs transmissions 782-788 are indecent PDCCH transmissions (and not repetitions) the UE 115 does not perform joint decoding of the PDCCH transmissions 782-788.

The coherent filtering at 714 may include performing, by the UE 115, channel estimation on DMRS in each SS set occasion to generate preliminary channel estimates, and coherently filtering, by the UE 115, the preliminary channel estimates to generate a coherently filtered channel estimate.

In some implementations, if a PDCCH is not transmitted in the set of bundled CCEs in any SS set occasion of the SS set occasions where PDCCH DMRS are bundled, a PDCCH DMRS is not transmitted.

The above implementations can be used with non-distributive CCE-to-REG mapping or distributive CCE-to-REG mapping, such as where each REG bundle contains multiple (e.g., six REGs, that is each REG bundle corresponds to a single CCE) and only one CCE is allocated to each PDCCH candidate (i.e., aggregation level is one). However, the above implementations work the same in CCE domain or physical domain because CCE-to-REG mapping may be a one to one mapping. Working in the virtual/CCE may be less complicated and provides coverage enhancement independent of CCE-to-REG mapping options.

In addition, because the CCE domain is virtual, the CCE domain is may only be defined for a number of CCEs that are actually allocated to the CORESET. The number can be determined from a number of physical resources allocated to the UE based on the relationship that a CCE corresponds to multiple (e.g., six) REGs.

The above implementations apply to other more complicated cases where allocated REG bundles of a PDCCH are not contiguous, when distributive CCE-to-REG mapping is configured, and/or when a PDCCH candidate is transmitted in multiple REGs bundles.

Figure 10:
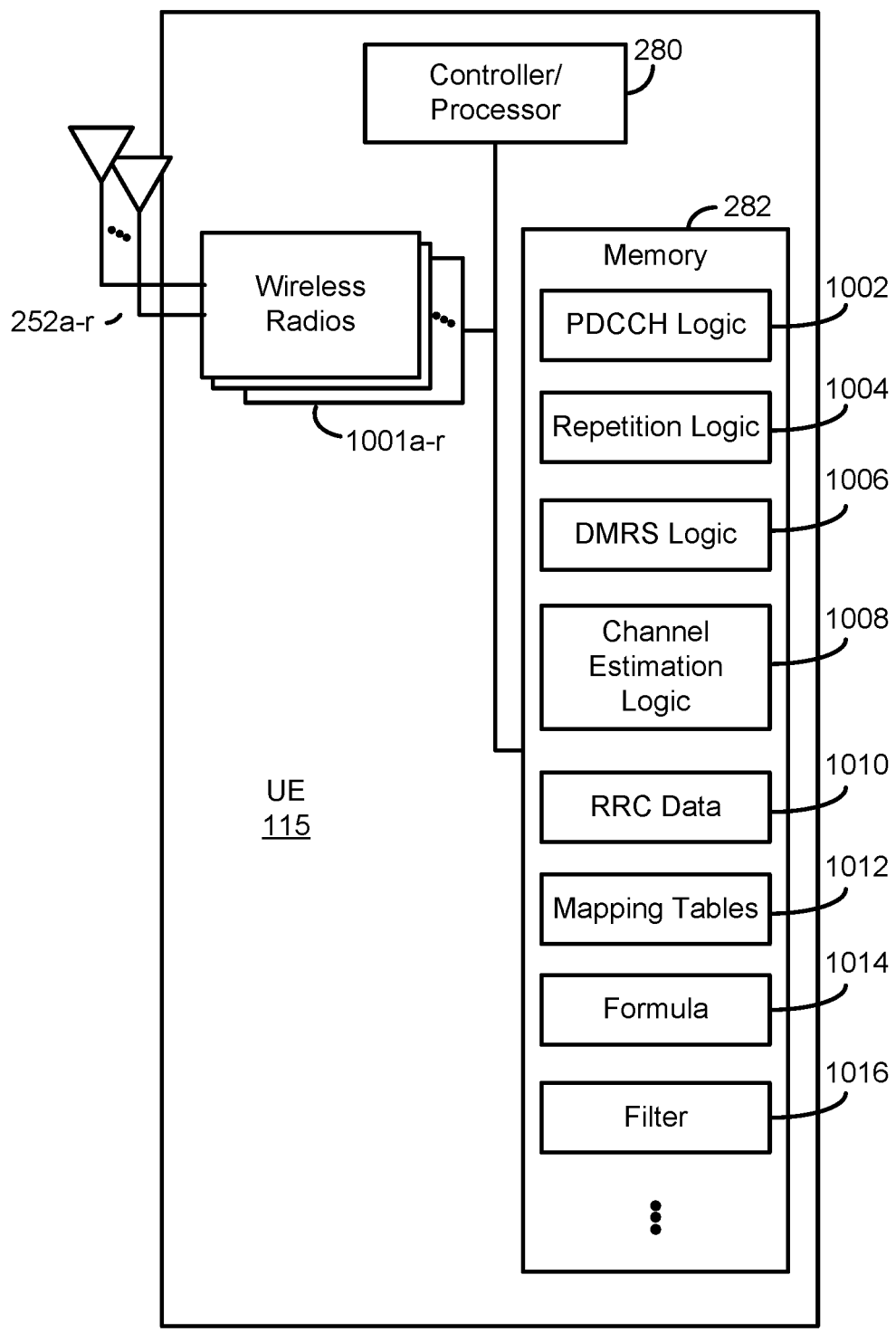
FIG. 10 is a block diagram illustrating a UE configured according to aspects of the present disclosure.
Figure 11:
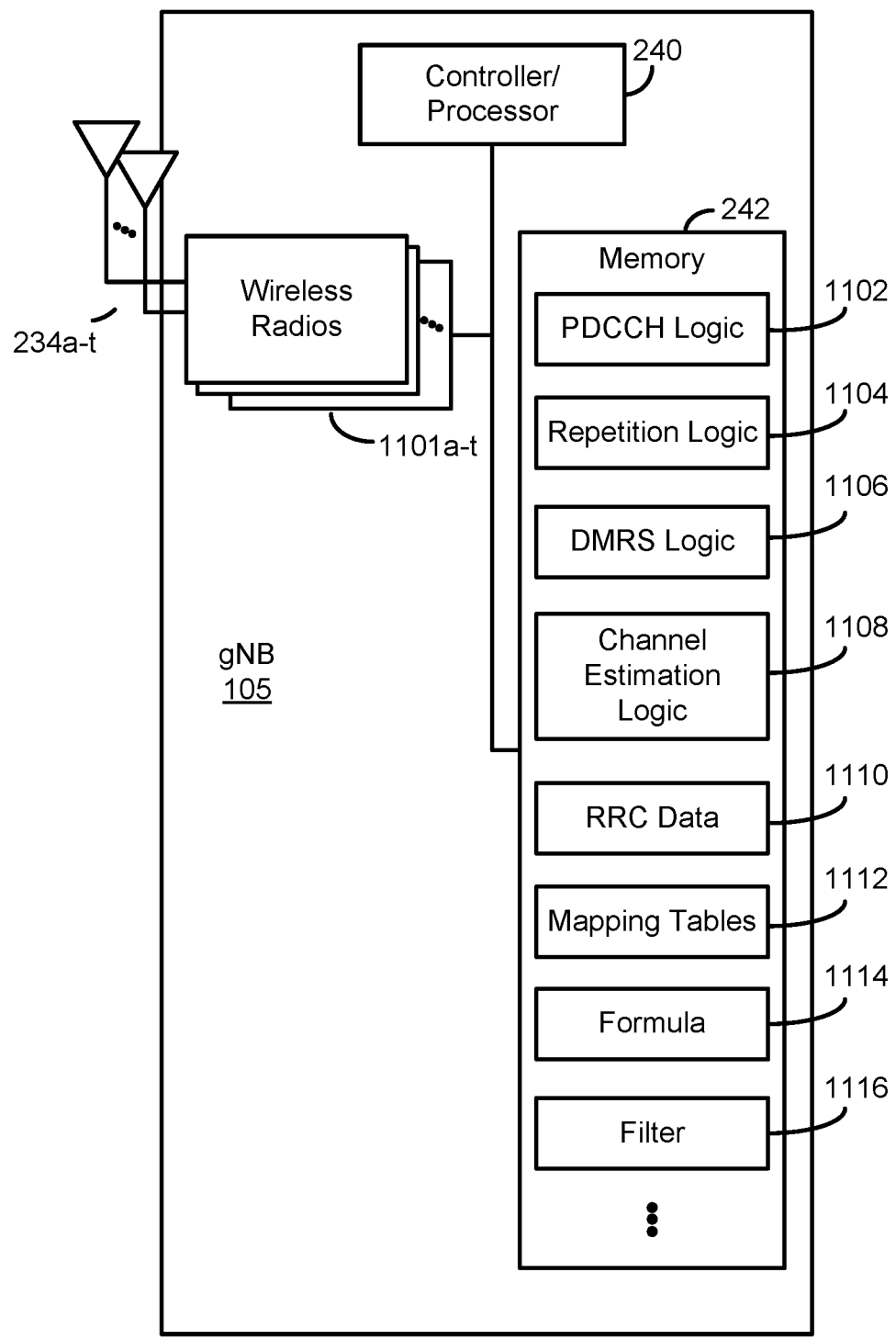
FIG. 11 is a block diagram illustrating a base station configured according to aspects of the present disclosure.

FIG. 8 is a block diagram illustrating example blocks executed by a UE configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r includes various components and hardware, as illustrated in FIG. 2 for UE 115, including modulator/demodulators 254a-r, MIMO detector 256, receive processor 258, transmit processor 264, and TX MIMO processor 266. UE 115 may receive signals (e.g., communications and data) from a base station or TRP, such as base station 105 as illustrated in FIG. 11. The base station 105 of FIG. 11 includes similar components to UE 115 of FIG. 10. For example, the base station 105 includes corresponding components 1102-1116 which correspond to components 1002-1016 of the UE 115.

As illustrated in FIG. 10, UE 115 includes PDCCH Logic 1002, Repetition Logic 1004 (e.g., PDCCH Repetition Logic), DMRS Logic 1006, Channel Estimation Logic 1008, and RRC data 1010. PDCCH Logic 1002 may be configured to receive and decode PDCCH transmission. For example, PDCCH Logic 1002 may include program code to determine PDCCH occasions and decode PDCCH transmissions. Repetition Logic 1004 may be configured to receive and decode PDCCH repetition transmission. For example, Repetition Logic 1004 may include program code to determine PDCCH repetition occasions and decode PDCCH repetition transmissions. DMRS Logic 1006 may be configured to receive and decode PDCCH transmission. For example, DMRS Logic 1006 may include program code to determine DMRS occasions and decode DMRS transmissions.

Channel Estimation Logic 1008 may be configured to perform channel estimation based on received DMRS transmissions. For example, Channel Estimation Logic 1008 may include program code to determine a channel estimation value, such as a preliminary channel estimation value. Channel Estimation Logic 1008 may utilize one or more other components (e.g., 1016) to determine an actual or final channel estimation value based on preliminary channel estimation values. RRC data 1010 includes preset or predetermined data, i.e., programmed or hardcoded data indicating one or more settings for PDCCH DMRS bundling. Additionally, RRC data 1010 may be configurable, such as by transmission and/or reception of an RRC message.

UE 115 may additionally include one or more mappings tables 1012, formulas 1014, and a filter 1016, as illustrated in FIG. 10. The one or more mapping tables 1012 may include or correspond to mapping tables for mapping virtual resources to physical resources, such as CCE index values to REGs. The filter 1016 may include or correspond to a coherent filter (e.g., an orthogonal coherent filter) and is configured to coherently filter a plurality of NB DMRS. The formula 1014 may include or correspond to an equation or formula configured to generate CCE index values, such as equation 400.

At block 800, a UE monitors a plurality of search space (SS) set occasions for Physical Downlink Control Channel (PDCCH) demodulation reference signals (DMRSs). A UE, such as UE 115, may execute, under control of controller/processor 280, PDCCH logic 1002 and DMRS Logic 1006, and optionally Repetition Logic 1004, stored in memory 282. The execution environment of the PDCCH logic 1002 and the DMRS Logic 1006 provides the functionality for UE 115 to define and perform the PDCCH DMRS bundling. Additionally, the execution environment of the Repetition Logic 1004 provides the functionality for UE 115 to define and perform PDCCH repetition procedures. The execution environment of the PDCCH logic 1002 and the DMRS Logic 1006 defines the different PDCCH DMRS bundling processes, which may include monitoring and receiving PDCCH and DMRS transmission information from a serving base station related to the PDCCH DMRS bundling processes, such as in receiving and decoding the relevant information from a PDCCH transmission, such as a downlink control message (e.g., DCI).

Within the execution environment of the PDCCH logic 1002 and the DMRS Logic 1006, UE 115, under control of controller/processor 280, identifies multiple SS set occasions. The SS set occasions may be of one or more SS sets. UE 115 uses antennas 252a-r and wireless radios 1100a-r to monitor a control space for potential PDCCH and DMRS transmissions.

At block 801, the UE receives, for each SS set occasion, a narrowband (NB) DMRS for a particular PDCCH candidate of the corresponding SS set occasion based on a Control Channel Element (CCE) allocation pattern. The execution environment of the PDCCH logic 1002 and the DMRS Logic 1006 provides UE 115 the functionalities described with respect to the various aspects of the present disclosure. UE 115 receives the NB DMRS transmissions for or of corresponding PDCCH transmissions at locations for a particular PDCCH candidate in each SS set occasion based on the CCE allocation pattern.

As UE 115 receives the signals (indicative of or corresponding to PDCCH and DMRS transmissions) via antennas 252a-r and wireless radios 1100a-r while monitoring SS set occasions of a control space (CORESET), UE 115 identifies the PDCCH and DMRS transmission contained therein and the corresponding values of fields thereof. As the PDCCH and DMRS transmissions may not be signaled by the serving base station ahead of time, the UE 115 may blindly monitor the SS set occasions of the control space (e.g., CORESET) to receive and detect the PDCCH and DMRS transmissions. For example, within the execution environment of the PDCCH logic 1002 and the DMRS Logic 1006, UE 115, under control of controller/processor 280, attempts to decode the received signals using multiple different PDCCH and DMRS transmission settings.

UE 115 may then determine the settings or a transmission pattern of PDCCHs in the control space based on received signals, such as successful decoding thereof. For example UE 115 may determine the size and location of the PDCCH transmissions and the accompanying DMRS transmissions.

At block 802, the UE processes the plurality of received NB DMRSs by coherent filtering to determine a channel estimation. For example, once UE 115 determine receives the DMRS transmissions (and corresponding PDCCH transmissions) at block 801, UE 115 may determine the CCE allocation pattern thereof. For example, UE 115 determines the CCE allocation as illustrated and described with reference to FIGS. 5A, 5B, 6A, 6B, and 7. To illustrate, the CCE allocation where PDCCHs are transmitted with DMRS bundling as illustrated in the physical domain in FIGS. 5A, 5B, 6B, and 7, and as illustrated in tables in FIGS. 4 and 6A. UE 115 may process the received PDCCH transmissions (such as PDCCH repetition transmissions) using controller/processor 280. UE 115 may perform channel estimation on each DMRS to generate preliminary channel estimates and coherently filter the preliminary channel estimates to generate a coherently filtered channel estimate.

Additionally, when PDCCH repetitions are transmitted, UE 115 may receive, for each NB DMRS, a corresponding PDCCH transmission based on the CCE allocation pattern, generate, a set of log likelihood ratios for each PDCCH, combine the log likelihood ratios of the PDCCHs to generate a combined set of log likelihood ratios, and decode the corresponding PDCCH based on the combined set of log likelihood ratios.

The UE 115 may execute additional blocks (or the UE 115 may be configured further perform additional operations) in other implementations. For example, the UE 115 may perform one or more operations described above. As another example, the UE 115 may perform and/or operate according to one or more aspects as described below.

In a first aspect, the CCE allocation pattern corresponds to the same CCE index values in a virtual resource domain, and wherein the plurality of NB DMRSs are received in the same CCE index values in each SS set occasion of the plurality of SS set occasions.

In a second aspect, alone or in combination with one or more of the above aspects, the UE 115 receives for each SS set occasion, a PDCCH transmission of the SS set occasion based on the CCE allocation pattern, wherein each PDCCH has the same payload data.

In a third aspect, alone or in combination with one or more of the above aspects, while in a Common Search Space (CSS) mode, the CCE allocation pattern is determined based on the same PDCCH candidate index.

In a fourth aspect, alone or in combination with one or more of the above aspects, while in a UE-specific Search Space (USS) mode, the CCE allocation pattern is determined based on CCE allocation in a particular SS set occasion.

In a fifth aspect, alone or in combination with one or more of the above aspects, the UE 115 receives, for each SS set occasion, a second plurality of NB DMRSs for a second particular PDCCH candidate of the SS set occasion based on the CCE allocation pattern, and the UE 115 processes the second plurality of received NB DMRSs by coherent filtering to determine a channel estimation.

In a sixth aspect, alone or in combination with one or more of the above aspects, the UE 115 determines that DMRS bundling is enabled for the plurality of NB DMRSs for resources corresponding to the plurality of SS set occasions.

In a seventh aspect, alone or in combination with one or more of the above aspects, the UE 115 performs channel estimation on each DMRS to generate preliminary channel estimates, and the UE 115 coherently filters the preliminary channel estimates to generate a coherently filtered channel estimate.

In an eighth aspect, alone or in combination with one or more of the above aspects, the UE 115 receives, for each NB DMRS, a corresponding PDCCH transmission based on the CCE allocation pattern, where each PDCCH has the same payload data, and the UE 115 generates a set of log likelihood ratios for each PDCCH. The UE 115 also combines the log likelihood ratios of the PDCCHs to generate a combined set of log likelihood ratios, and the UE 115 decodes the corresponding PDCCH based on the combined set of log likelihood ratios.

In a ninth aspect, alone or in combination with one or more of the above aspects, while in a UE-specific Search Space (USS) mode, the CCE allocation pattern is determined based on CCE allocation in a particular SS set occasion.

In a tenth aspect, alone or in combination with one or more of the above aspects, the UE 115 sets a reference SS set occasion for a UE-specific Search Space (USS) mode based on receiving a radio resource control (RRC) configuration message, and the UE 115 determines the CCE allocation pattern based on the reference SS set occasion and CCE allocation determination rules while in the USS mode.

In an eleventh aspect, alone or in combination with one or more of the above aspects, the UE 115 sets a reference slot for a UE-specific Search Space (USS) mode based on receiving a radio resource control (RRC) configuration message, and the UE 115 determines the CCE allocation pattern based on the reference slot and CCE allocation determination rules while in the USS mode.

In a twelfth aspect, alone or in combination with one or more of the above aspects, the UE 115 receives, for each SS set occasion, a PDCCH transmission of the SS set occasion based on the CCE allocation pattern, where at least one PDCCH transmission has different payload data from at least one other PDCCH transmission.

In a thirteenth aspect, alone or in combination with one or more of the above aspects, the plurality of SS set occasions are included in a single SS set.

In a fourteenth aspect, alone or in combination with one or more of the above aspects, the plurality of SS set occasions are included in multiple SS sets.

Accordingly, a UE and a base station may perform DMRS bundling operations. By performing DMRS bundling operations, throughput and reliability may be increased and latency may be decreased.

FIG. 9 is a block diagram illustrating example blocks executed by a base station configured according to an aspect of the present disclosure. The example blocks will also be described with respect to base station 105 (e.g., gNB) as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1101a-t and antennas 252a-t. Wireless radios 1101a-t includes various components and hardware, as illustrated in FIG. 2 for base station 105, including modulator/demodulators 232a-t, MIMO detector 236, receive processor 238, transmit processor 220, and TX MIMO processor 230.

At block 900, a base station identifies a plurality of search space (SS) set occasions for transmitting Physical Downlink Control Channel (PDCCH) demodulation reference signals (DMRSs). A base station, such as base station 105, may execute, under control of controller/processor 240, PDCCH logic 1102 and DMRS Logic 1106, stored in memory 242. The execution environment of the PDCCH logic 1102 and the DMRS Logic 1106 provides the functionality for base station 105 to define and perform the PDCCH DMRS bundling procedures. The execution environment of the Repetition Logic 1104 provides the functionality for base station 105 to define and perform the PDCCH repetition procedures. Base station 105, within the execution environment for the above logic, receives the downlink control message via antennas 232*a-t* and wireless radios 1101*a-t*, base station 105 identifies a plurality of SS set occasions, such as 522-528, for transmitting NB PDCCH DMRSs, such as first DMRS 382.

At block 901, the base station identifies a plurality of PDCCH candidates for each SS set occasion. The execution environment of one or more of logic 1102-1106 provides base station 105 the functionalities described with respect to the various aspects of the present disclosure. Base station 105 identifies the possible PDCCH transmission locations for each SS set occasion. Within the execution environment, base station 105, under control of controller/processor 280, may employ equation 400 to determine possible PDCCH transmission locations in a virtual domain, as illustrated in FIG. 6A.

At block 902, the base station identifies, for each SS set occasion, a particular PDCCH candidate of the plurality of PDCCH candidates based on a Control Channel Element (CCE) allocation pattern. Once base station 105 identifies (e.g., determines) the PDCCH candidates at block 901, base station 105 may identify a particular PDCCH candidate of the identified plurality of candidates for each SS set occasion to transmit the PDCCH (i.e., the actual PDCCH or PDCCH transmission). As illustrated in FIGS. 5A and 6B, the base station may use currently allocated CCEs (e.g., CCEs allocated by equation 400) or may allocated new CCEs to one or more of the SS set occasion, as shown in FIGS. 6A and 6B. For example, base station 105 determines the CCE allocation pattern based on a PDCCH candidate index value in CSS, as in FIGS. 5A and 5B. As another example, base station 105 determines CCE allocation pattern based on a reference location or allocation in USS, as in FIGS. 6A and 6B. The reference location or allocation may be indicated or defined in terms of a reference SS set occasion, a reference slot, and/or a reference PDCCH candidate, as described with reference to FIGS. 6A and 6B.

At block 903, the base station transmits, for each SS set occasion, a narrowband (NB) DMRS for the corresponding identified PDCCH candidate. Once base station 105 determines the CCE allocation pattern and location of the PDCCHs and DMRS transmissions at block 902, base station 105 may transmit the NB DMRS transmission for the PDCCH transmissions via wireless radios 1101*a-t* and antennas 232*a-t*. Base station 105 may generate the transmitted PDCCH and NB DMRS transmissions using controller/processor 240.

The base station 105 may execute additional blocks (or the base station 105 may be configured further perform additional operations) in other implementations. For example, the base station 105 may perform one or more operations described above. As another example, the base station 105 may perform and/or operate according to one or more aspects as described below.

In a first aspect, the CCE allocation pattern corresponds to the same CCE index values in a virtual resource domain, and where each of the NB DMRSs are transmitted in the same CCE index values in each SS set occasion of the plurality of SS set occasions.

In a second aspect, alone or in combination with one or more of the above aspects, the base station 105 transmits, for each SS set occasion, a PDCCH transmission of the SS set occasion based on the CCE allocation pattern, where each PDCCH has the same payload data.

In a third aspect, alone or in combination with one or more of the above aspects, while in a Common Search Space (CSS) mode, the CCE allocation pattern is determined based on a PDCCH candidate index.

In a fourth aspect, alone or in combination with one or more of the above aspects, while in a UE-specific Search Space (USS) mode, the CCE allocation pattern is determined based on CCE allocation in a particular SS set occasion.

In a fifth aspect, alone or in combination with one or more of the above aspects, the base station 105 transmits, for each SS set occasion, a second PDCCH and a corresponding second NB DMRS for second PDCCH candidates according to the CCE allocation pattern.

In a sixth aspect, alone or in combination with one or more of the above aspects, the base station 105 refrains, for each SS set occasion, from transmitting the NB DMRS in other PDCCH candidates.

In a seventh aspect, alone or in combination with one or more of the above aspects, while in a UE-specific Search Space (USS) mode, the CCE allocation pattern is determined based on CCE allocation in a particular SS set occasion, and where the particular SS set occasion is a first SS set occasion.

In an eighth aspect, alone or in combination with one or more of the above aspects, the base station 105 sets a reference SS set occasion for a UE-specific Search Space (USS) mode based on transmitting a radio resource control (RRC) configuration message, and the base station 105 determines the CCE allocation pattern based on the reference SS set occasion and CCE allocation determination rules while in the USS mode.

In a ninth aspect, alone or in combination with one or more of the above aspects, the base station 105 sets a reference slot for a UE-specific Search Space (USS) mode based on transmitting a radio resource control (RRC) configuration message, and the base station 105 determines the CCE allocation pattern based on the reference slot and CCE allocation determination rules while in the USS mode.

In a tenth aspect, alone or in combination with one or more of the above aspects, the base station 105 transmits, for each SS set occasion, a PDCCH transmission of the SS set occasion based on the CCE allocation pattern, where at least one PDCCH transmission has different payload data from at least one other PDCCH transmission.

In an eleventh aspect, alone or in combination with one or more of the above aspects, the plurality of SS set occasions are included in a single SS set.

In a twelfth aspect, alone or in combination with one or more of the above aspects, the plurality of SS set occasions are included in multiple SS sets.

Accordingly, a UE and a base station may perform DMRS bundling operations. By performing DMRS bundling operations, throughput and reliability may be increased and latency may be decreased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
monitoring, by a user equipment (UE), a plurality of search space (SS) set occasions for Physical Downlink Control Channel (PDCCH) demodulation reference signals (DMRSs);
receiving, by the UE for each SS set occasion of the plurality of SS set occasions, a narrowband (NB) DMRS for a particular PDCCH candidate of the SS set occasion based on a Control Channel Element (CCE) allocation pattern; and
processing, by the UE, the plurality of received NB DMRSs by coherent filtering to determine a channel estimation.

2. The method of claim 1, wherein the CCE allocation pattern corresponds to the same CCE index values in a virtual resource domain, and wherein the plurality of NB DMRSs are received in the same CCE index values in each SS set occasion of the plurality of SS set occasions.

3. The method of claim 1, further comprising receiving, by the UE for each SS set occasion, a PDCCH transmission of the SS set occasion based on the CCE allocation pattern, wherein each PDCCH has the same payload data.

4. The method of claim 1, wherein while in a Common Search Space (CSS) mode, the CCE allocation pattern is determined based on the same PDCCH candidate index.

5. The method of claim 1, wherein while in a UE-specific Search Space (USS) mode, the CCE allocation pattern is determined based on CCE allocation in a particular SS set occasion.

6. The method of claim 1, further comprising:
receiving, by the UE for each SS set occasion, a second plurality of NB DMRSs for a second particular PDCCH candidate of the SS set occasion based on the CCE allocation pattern; and
processing, by the UE, the second plurality of received NB DMRSs by coherent filtering to determine a channel estimation.

7. The method of claim 1, further comprising determining, by the UE, that DMRS bundling is enabled for the plurality of NB DMRSs for resources corresponding to the plurality of SS set occasions.

8. The method of claim 1, further comprising:
performing, by the UE, channel estimation on each DMRS to generate preliminary channel estimates; and
coherently filtering, by the UE, the preliminary channel estimates to generate a coherently filtered channel estimate.

9. The method of claim 1, further comprising:
receiving, by the UE for each NB DMRS, a corresponding PDCCH transmission based on the CCE allocation pattern, wherein each PDCCH has the same payload data;
generating, by the UE, a set of log likelihood ratios for each PDCCH;
combining, by the UE, the log likelihood ratios of the PDCCHs to generate a combined set of log likelihood ratios; and
decoding, by the UE, the corresponding PDCCH based on the combined set of log likelihood ratios.

10. A method of wireless communication comprising:
identifying, by a base station, a plurality of search space (SS) set occasions for transmitting Physical Downlink Control Channel (PDCCH) demodulation reference signals (DMRSs);
identifying, by the base station, a plurality of PDCCH candidates for each SS set occasion of the plurality of SS set occasions;
identifying, by the base station for each SS set occasion, a particular PDCCH candidate of the plurality of PDCCH candidates based on a Control Channel Element (CCE) allocation pattern; and
transmitting, by the base station for each SS set occasion, a narrowband (NB) DMRS for the corresponding identified PDCCH candidate.

11. The method of claim 10, wherein the CCE allocation pattern corresponds to the same CCE index values in a virtual resource domain, and wherein each of the NB DMRSs are transmitted in the same CCE index values in each SS set occasion of the plurality of SS set occasions.

12. The method of claim 10, further comprising transmitting, by the base station for each SS set occasion, a PDCCH transmission of the SS set occasion based on the CCE allocation pattern, wherein each PDCCH has the same payload data.

13. The method of claim 10, wherein while in a Common Search Space (CSS) mode, the CCE allocation pattern is determined based on a PDCCH candidate index.

14. The method of claim 10, wherein while in a UE-specific Search Space (USS) mode, the CCE allocation pattern is determined based on CCE allocation in a particular SS set occasion.

15. The method of claim 10, further comprising transmitting, by the base station for each SS set occasion, a second PDCCH and a corresponding second NB DMRS for second PDCCH candidates according to the CCE allocation pattern.

16. The method of claim 10, further comprising refraining, by the base station for each SS set occasion, from transmitting the NB DMRS in other PDCCH candidates.

17. An apparatus configured for wireless communication, the apparatus comprising:
at least one processor; and
a memory coupled to the at least one processor,
wherein the at least one processor is configured:
to monitor a plurality of search space (SS) set occasions for Physical Downlink Control Channel (PDCCH) demodulation reference signals (DMRSs);
to receive, for each SS set occasion of the plurality of SS set occasions, a narrowband (NB) DMRS for a particular PDCCH candidate of the SS set occasion based on a Control Channel Element (CCE) allocation pattern; and
to process the plurality of received NB DMRSs by coherent filtering to determine a channel estimation.

18. The apparatus of claim 17, wherein while in a UE-specific Search Space (USS) mode, the CCE allocation pattern is determined based on CCE allocation in a particular SS set occasion.

19. The apparatus of claim 17, wherein the at least one processor is further configured to set a reference SS set occasion for a UE-specific Search Space (USS) mode based on receiving a radio resource control (RRC) configuration message, and wherein the at least one processor is further configured to determine the CCE allocation pattern based on the reference SS set occasion and CCE allocation determination rules while in the USS mode.

20. The apparatus of claim 17, wherein the at least one processor is further configured to set a reference slot for a UE-specific Search Space (USS) mode based on receiving a radio resource control (RRC) configuration message, and wherein the at least one processor is further configured to determine the CCE allocation pattern based on the reference slot and CCE allocation determination rules while in the USS mode.

21. The apparatus of claim 17, wherein the at least one processor is further configured to receive, for each SS set occasion, a PDCCH transmission of the SS set occasion based on the CCE allocation pattern, wherein at least one PDCCH transmission has different payload data from at least one other PDCCH transmission.

22. The apparatus of claim 17, wherein the plurality of SS set occasions are included in a single SS set.

23. The apparatus of claim 17, wherein the plurality of SS set occasions are included in multiple SS sets.

24. An apparatus configured for wireless communication, the apparatus comprising:
at least one processor; and
a memory coupled to the at least one processor,
wherein the at least one processor is configured:
to identify a plurality of search space (SS) set occasions for transmitting Physical Downlink Control Channel (PDCCH) demodulation reference signals (DMRSs);
to identify a plurality of PDCCH candidates for each SS set occasion of the plurality of SS set occasions;

to identify, for each SS set occasion, a particular PDCCH candidate of the plurality of PDCCH candidates based on a Control Channel Element (CCE) allocation pattern; and to transmit, for each SS set occasion, a narrowband (NB) DMRS for the corresponding identified PDCCH candidate.

25. The apparatus of claim 24, wherein while in a UE-specific Search Space (USS) mode, the CCE allocation pattern is determined based on CCE allocation in a particular SS set occasion, and wherein the particular SS set occasion is a first SS set occasion.

26. The apparatus of claim 24, wherein the at least one processor is further configured to set a reference SS set occasion for a UE-specific Search Space (USS) mode based on transmitting a radio resource control (RRC) configuration message, and wherein the at least one processor is further configured to determine the CCE allocation pattern based on the reference SS set occasion and CCE allocation determination rules while in the USS mode.

27. The apparatus of claim 24, wherein the at least one processor is further configured to set a reference slot for a UE-specific Search Space (USS) mode based on transmitting a radio resource control (RRC) configuration message, and wherein the at least one processor is further configured to determine the CCE allocation pattern based on the reference slot and CCE allocation determination rules while in the USS mode.

28. The apparatus of claim 24, wherein the at least one processor is further configured to transmit, for each SS set occasion, a PDCCH transmission of the SS set occasion based on the CCE allocation pattern, wherein at least one PDCCH transmission has different payload data from at least one other PDCCH transmission.

29. The apparatus of claim 24, wherein the plurality of SS set occasions are included in a single SS set.

30. The apparatus of claim 24, wherein the plurality of SS set occasions are included in multiple SS sets.

* * * * *